United States Patent
Nozawa

(10) Patent No.: US 11,662,959 B2
(45) Date of Patent: May 30, 2023

(54) PRINT MANAGEMENT APPARATUS, PRINT MANAGEMENT METHOD, AND PRINTING SYSTEM

(71) Applicant: CANON KABUSHIKI KAISHA, Tokyo (JP)

(72) Inventor: Tomoki Nozawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/516,507

(22) Filed: Nov. 1, 2021

(65) Prior Publication Data

US 2022/0137886 A1  May 5, 2022

(30) Foreign Application Priority Data

Nov. 4, 2020 (JP) .............................. JP2020-184205

(51) Int. Cl.
*G06F 3/12* (2006.01)

(52) U.S. Cl.
CPC .......... *G06F 3/1205* (2013.01); *G06F 3/1253* (2013.01); *G06F 3/1286* (2013.01)

(58) Field of Classification Search
CPC combination set(s) only.
See application file for complete search history.

(56) References Cited

U.S. PATENT DOCUMENTS

| | | | | |
|---|---|---|---|---|
| 2010/0196042 A1* | 8/2010 | Tsujita | ............... | G03G 15/2039 399/82 |
| 2013/0084092 A1* | 4/2013 | Ooyanagi | .......... | G03G 15/2039 399/69 |
| 2014/0348557 A1* | 11/2014 | Hasegawa | ............... | G03G 15/50 399/327 |
| 2017/0052491 A1* | 2/2017 | Hirota | ................. | G03G 15/5058 |
| 2021/0333725 A1* | 10/2021 | Nakamoto | ........... | G03G 15/167 |
| 2021/0357011 A1* | 11/2021 | Li | ............................ | F24F 11/77 |
| 2022/0171313 A1* | 6/2022 | Kaino | ................ | G03G 15/5045 |

FOREIGN PATENT DOCUMENTS

JP  2015000557 A  1/2015

* cited by examiner

*Primary Examiner* — Helen Zong
(74) *Attorney, Agent, or Firm* — Canon U.S.A., Inc. IP Division

(57) ABSTRACT

An estimated temperature adjustment time, the number of times of temperature adjustments, and so on for printing jobs in a current print sequence are displayed together with an estimated print time, and the print sequence can be changed so as to decrease the number of times of temperature adjustments.

8 Claims, 21 Drawing Sheets

FIG. 4A

| ORDER ID | JOB ID | JOB NAME | PAGES | NUMBER OF COPIES | PAPER NAME | PDF PATH |
|---|---|---|---|---|---|---|
| 0001 | J001 | Job 001 | 50 | 10 | Paper 1 | \Data\P001.pdf |
| 0001 | J002 | Job 002 | 70 | 20 | Paper 2 | \Data\P002.pdf |
| 0002 | J003 | Job 003 | 60 | 50 | Paper 3 | \Data\P003.pdf |
| 0003 | J004 | Job 004 | 60 | 30 | Paper 3 | \Data\P004.pdf |
| 0004 | J005 | Job 005 | 100 | 10 | Paper 4 | \Data\P005.pdf |
| 0005 | J006 | Job 006 | 30 | 40 | Paper 1 | \Data\P006.pdf |
| 0005 | J007 | Job 007 | 80 | 30 | Paper 2 | \Data\P007.pdf |
| 0005 | J008 | Job 008 | 60 | 40 | Paper 1 | \Data\P008.pdf |

FIG. 4B

| ORDER ID | JOB ID | JOB NAME | PRINTER | STATUS | COMPLETION DATE AND TIME | PAGES | NUMBER OF COPIES | PAPER NAME | PDF PATH |
|---|---|---|---|---|---|---|---|---|---|
| 0001 | J001 | Job 001 | Printer 1 | Completed | 06/18/2020 10:00 | 50 | 10 | Paper 1 | \Data\P001.pdf |
| 0001 | J002 | Job 002 | Printer 2 | Processing | | 70 | 20 | Paper 2 | \Data\P002.pdf |
| 0002 | J003 | Job 003 | Printer 1 | Ready | | 60 | 50 | Paper 3 | \Data\P003.pdf |
| 0003 | J004 | Job 004 | Printer 2 | Ready | | 60 | 30 | Paper 3 | \Data\P004.pdf |
| 0004 | J005 | Job 005 | Printer 1 | Ready | | 100 | 10 | Paper 4 | \Data\P005.pdf |
| 0005 | J006 | Job 006 | Printer 2 | Ready | | 30 | 40 | Paper 1 | \Data\P006.pdf |
| 0005 | J007 | Job 007 | Printer 1 | Ready | | 80 | 30 | Paper 2 | \Data\P007.pdf |
| 0005 | J008 | Job 008 | Printer 2 | Ready | | 60 | 40 | Paper 1 | \Data\P008.pdf |

FIG. 6A

| PRINTER NAME | PRINTER MODEL |
|---|---|
| Printer 1 | Printer A |
| Printer 2 | Printer B |

FIG. 6B

| PRINTER MODEL | TIME TAKEN TO INCREASE TEMPERATURE | TIME TAKEN TO DECREASE TEMPERATURE | PPM |
|---|---|---|---|
| Printer A | 3 | 10 | 100 |
| Printer B | 5 | 18 | 80 |

FIG. 6C

| PRINTER MODEL | SURFACE PROPERTY | BASIS WEIGHT | TEMPERATURE |
|---|---|---|---|
| Printer A | Normal | 60 TO 75 | 165 |
| Printer A | Normal | 76 TO 90 | 170 |
| Printer A | Normal | 91 TO 105 | 175 |
| Printer A | Normal | 106 TO 120 | 180 |
| Printer A | Coated | 60 TO 75 | 170 |
| Printer A | Coated | 76 TO 90 | 175 |
| Printer A | Coated | 91 TO 105 | 180 |
| Printer A | Coated | 106 TO 120 | 185 |
| Printer B | Normal | 60 TO 75 | 165 |
| Printer B | Normal | 76 TO 90 | 170 |
| Printer B | Normal | 91 TO 105 | 175 |
| Printer B | Normal | 106 TO 120 | 180 |
| Printer B | Coated | 60 TO 75 | 170 |
| Printer B | Coated | 76 TO 90 | 175 |
| Printer B | Coated | 91 TO 105 | 180 |
| Printer B | Coated | 106 TO 120 | 185 |

FIG. 18A

| PRINTER MODEL | TIME TAKEN TO INCREASE TEMPERATURE | TIME TAKEN TO DECREASE TEMPERATURE | PPM | NUMBER OF FIXING UNITS | TEMPERATURE CAN BE OBTAINED |
|---|---|---|---|---|---|
| Printer A | 3 | 10 | 100 | 1 | true |
| Printer B | 5 | 18 | 80 | 2 | false |

FIG. 18B

| PRINTER MODEL | TIME FOR TEMPERATURE TO START FALLING |
|---|---|
| Printer A | 3 |
| Printer B | 3 |

FIG. 18C

| PRINTER MODEL | FIXING UNIT | TEMPERATURE |
|---|---|---|
| Printer A | Fixing Unit 1 | 140°C TO 190°C |
| Printer B | Fixing Unit 1 | 140°C TO 160°C |
| Printer B | Fixing Unit 2 | 161°C TO 190°C |

# PRINT MANAGEMENT APPARATUS, PRINT MANAGEMENT METHOD, AND PRINTING SYSTEM

BACKGROUND

Field

The present disclosure relates to a print management apparatus, a print management method, and a printing system.

Description of the Related Art

Recently, in the field of printing businesses, orders for various products are received from various customers, and production of a wide variety of products in small quantities is increasingly performed. Paper used in the production process can differ depending on the specific corresponding order, and various types of paper are used to perform printing in a printing business. To perform such printing, cut-sheet printers are often used, and most of such cut-sheet printers perform printing by toner printing. In the toner printing, a toner is fixed to paper by a fixing unit with heat, and the necessary temperature of the fixing unit changes depending on, for example, the surface property or basis weight of the paper. Therefore, to continuously perform printing on paper having different thicknesses, a temperature adjustment needs to be made for the fixing unit. Accordingly, a waiting time occurs, and productivity decreases. To visualize such a decrease in productivity for a user, a printing system has been proposed in which the occurrence of temperature adjustment is predicted and the estimated print time is displayed (see Japanese Patent Laid-Open No. 2015-557). A temperature adjustment is made at a time when the basis weight of paper for printing changes by a specific amount, and therefore, the number of times a temperature adjustment is made can depend on the print sequence of jobs. For example, in a case where a production schedule for a day is made in the morning and where all orders of the day are known at that time, an appropriate production schedule can be made so as to decrease the number of times of temperature adjustments. At a production site where orders are accepted several times a day, however, it is not possible to make an appropriate production schedule in the morning because it is usually not possible to anticipate orders that are not yet accepted.

Therefore, a printing business operator might determine the print sequence of jobs on the basis of the details of orders at a first time (in the morning, for example), and then needs to change the print sequence of jobs in response to acceptance of a new job as the day goes on, so as to decrease the number of times a temperature adjustment is made in order to increase productivity. However, it is troublesome and wasteful of operator resources for the operator to change the print sequence of jobs so as to decrease the number of times of temperature adjustments to the extent possible, each time a new order is accepted. Further, it is difficult for the operator to easily determine an appropriate change in the print sequence that can optimally decrease the number of times of temperature adjustments.

SUMMARY

Various embodiments of the present disclosure provide a technique for allowing an operator to easily determine whether efficient printing is performed and to aid them in making adjustments if desirable.

According to one embodiment of the present disclosure, a print management apparatus is provided that includes: a storage unit configured to store information regarding a plurality of print jobs that are received; a transmitting unit configured to transmit the plurality of print jobs to a printing apparatus; a calculation unit configured to calculate information regarding a temperature adjustment to be made for a fixing unit included in the printing apparatus, the temperature adjustment being made for printing the plurality of print jobs in a first print sequence; and a communication unit configured to communicate the information regarding the temperature adjustment. In addition, in a case where the temperature adjustment satisfies a predetermined condition, the communication unit gives a warning.

Further features of the present disclosure will become apparent from the following description of example embodiments with reference to the attached drawings.

BRIEF DESCRIPTION OF THE DRAWINGS

FIGS. 4A and 4B illustrate examples of order information and job information according to the first embodiment.

FIGS. 6A to 6C illustrate examples of printer information according to the first embodiment.

FIGS. 18A to 18C illustrate examples of printer information according to the third embodiment.

DESCRIPTION OF THE EMBODIMENTS

Hereinafter, various example embodiments of the present disclosure will be described with reference to the drawings. Note that the embodiments described below are only examples and are not intended to limit the scope of the present invention to the embodiments. Further, all combinations of features described in the following example embodiments are not necessarily essential to the every solution of the present invention described in the present disclosure.

First Embodiment

System Configuration of Printing System

Figure 1:
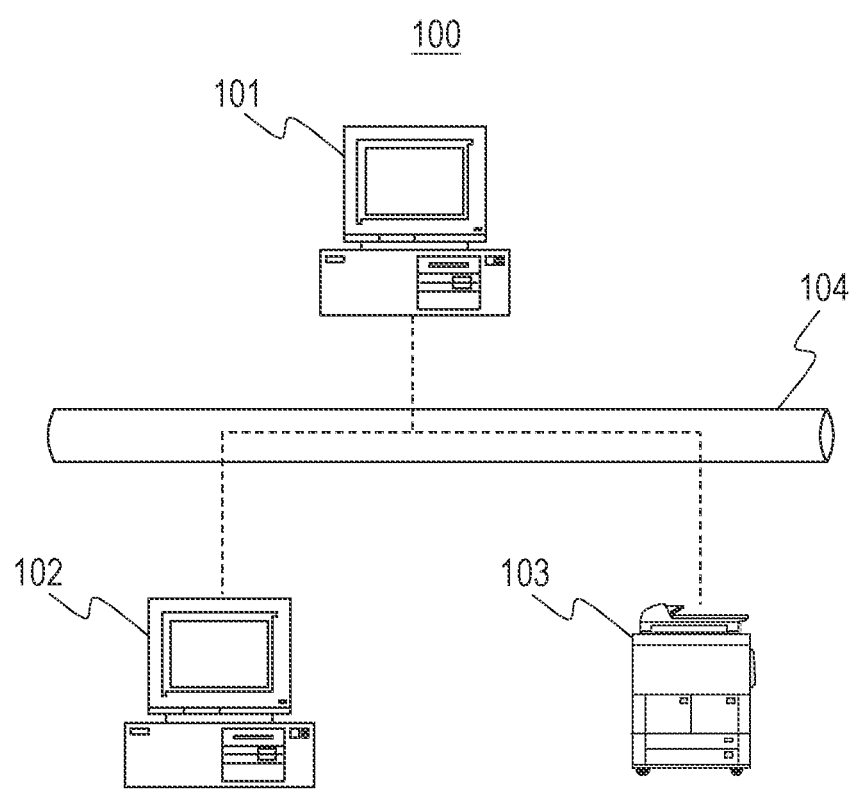
FIG. 1 illustrates a system configuration of a printing system according to a first embodiment.

FIG. 1 is a diagram illustrating a system configuration of a printing system 100 according to a first embodiment. The printing system 100 is configured such that information processing apparatuses 101 and 102 and an image forming apparatus 103 are connected to one another via a network 104. The information processing apparatus 101 is an order receiving server that receives orders for jobs (print jobs) from customers. The information processing apparatus 101, which is an order receiving server, manages order information of received orders and print data. The information processing apparatus 102 is an information processing apparatus that receives order information from the information processing apparatus 101 and transmits print data to the image forming apparatus 103. The information processing apparatus 102 is a print management apparatus that calculates, for example, an estimated print time, an estimated temperature adjustment time, the number of times of temperature adjustments, and the number of paper patterns described below. The image forming apparatus 103 is a printing apparatus (printer) that prints print data associated with an order on paper, from the information processing apparatus 102 via the network 104. Note that there may be a plurality of image forming apparatuses 103. The network 104 is a network, such as a local network, an intranet, or the Internet.

Hardware Configuration of Information Processing Apparatuses

Figure 2:
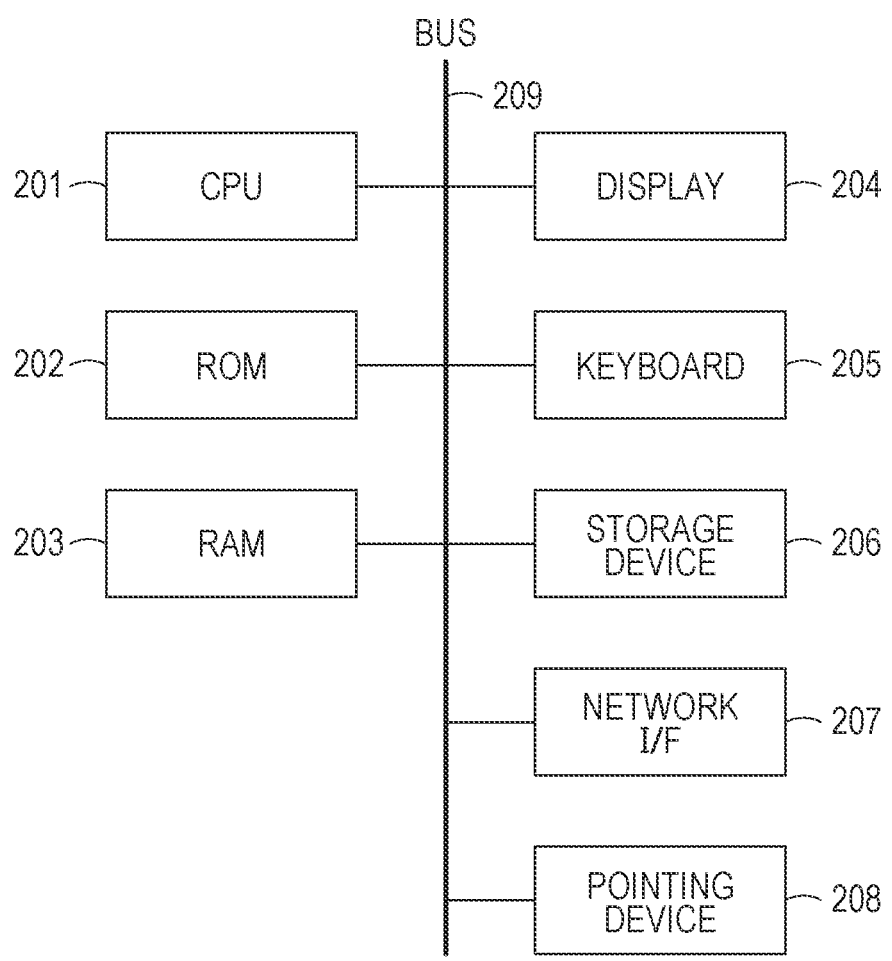
FIG. 2 illustrates a hardware configuration of information processing apparatuses according to the first embodiment.

Now, a hardware configuration of the information processing apparatuses 101 and 102 will be described with reference to FIG. 2. In FIG. 2, a central processing unit (CPU) 201 is a unit that reads, interprets, and executes a program stored in a storage device 206 described below to control, for example, a random access memory (RAM) 203 and a display 204 described below via a bus 209 described below. A read-only memory (ROM) 202 is a memory for which low-level input/output control with hardware connected to the bus 209 is performed. The RAM 203 is a memory that temporarily stores information used in computation by the CPU 201.

The display 204 is a display device that displays the results of calculation by the CPU 201, the results including an estimated print time, an estimated temperature adjustment time, the number of times of temperature adjustments, and the number of paper patterns. A keyboard 205 is an input device for accepting input from a user. However, in a case where the information processing apparatuses are smart devices, the information processing apparatuses include a touch panel, and therefore, need not include the keyboard 205. The storage device 206 is a device that stores programs and data to be used in calculation by the CPU 201. The storage device 206 is, for example, a hard disk drive or a drive for reading from and writing to a detachable recording medium.

A network interface (I/F) 207 is an interface for a connection to the network 104. A pointing device 208 is an input device, such as a mouse or a trackball, for the user to specify coordinates on the display 204. The bus 209 is a signal line to which the devices 201 to 208 described above are connected. With the configuration described above, the information processing apparatuses 101 and 102 perform information processing by the CPU 201 executing a program loaded to the RAM 203, and perform processes in flowcharts described below.

Functional Configurations of Information Processing Apparatuses

Figure 3:
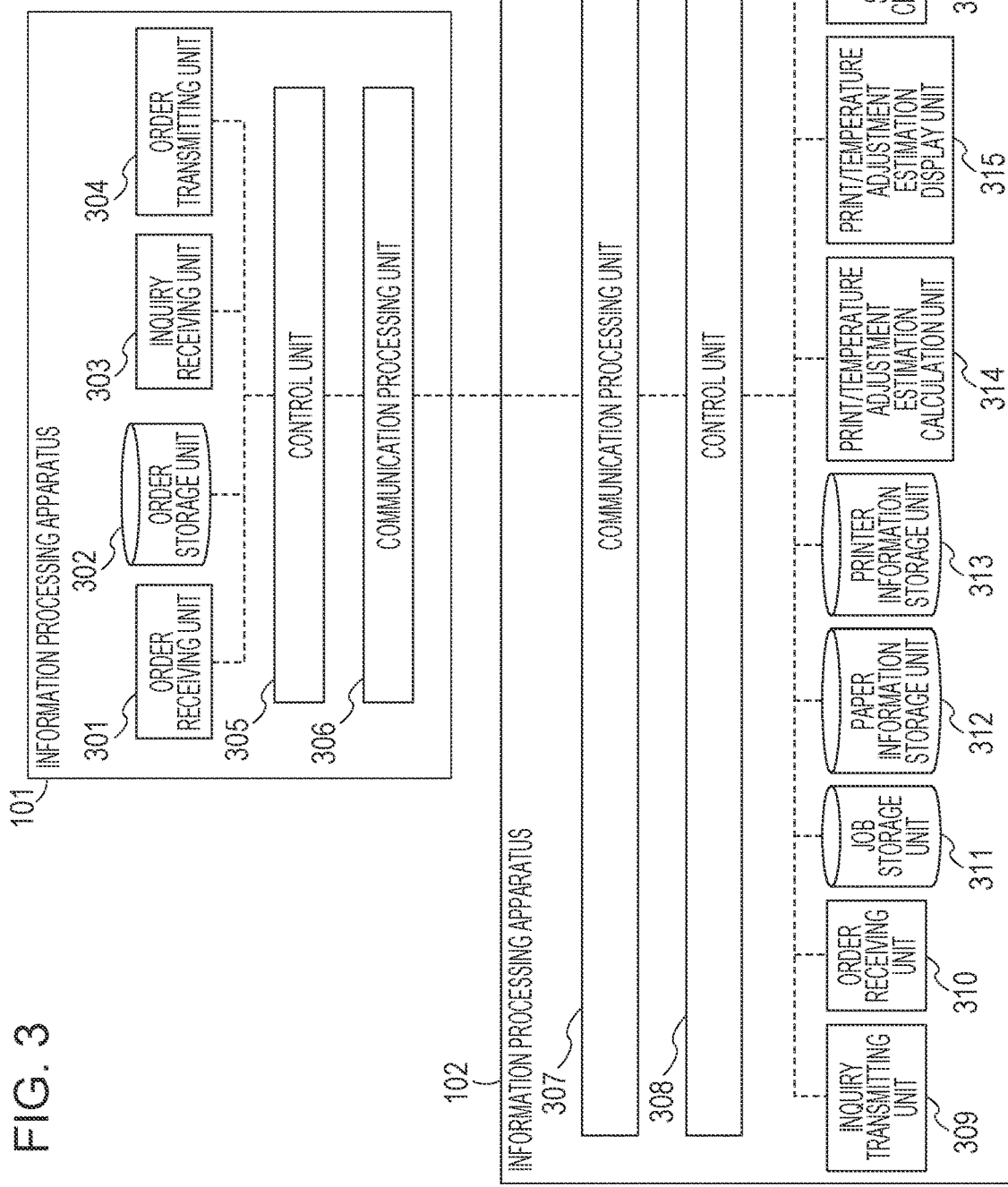
FIG. 3 illustrates functional configurations of the information processing apparatuses according to the first embodiment.

FIG. 3 illustrates functional configurations of the information processing apparatuses 101 and 102 according to the first embodiment. Although FIG. 3 illustrates configurations of functional units implemented by a computer executing a program, the configurations of the functional units need not be as in FIG. 3. For example, a plurality of functional units may be integrated, or some of the functions of a specific functional unit may be implemented by another functional unit. Each functional unit is implemented by the CPU 201 executing, as appropriate, a program stored in the storage device 206.

First, the information processing apparatus 101 will be described. An order receiving unit 301 accepts order information transmitted from a customer. An order storage unit 302 receives via a control unit 305 and retains order information accepted by the order receiving unit 301. An inquiry receiving unit 303 receives, from the information processing apparatus 102 via a communication processing unit 306, a request for downloading order information. An order transmitting unit 304 transmits order information to the information processing apparatus 102 via the communication processing unit 306.

The control unit 305 controls processing and communication between the communication processing unit 306 and the functional units 301 to 304. The communication processing unit 306 performs a communication process between the information processing apparatus 101 and the other information processing apparatus.

Next, the information processing apparatus 102 will be described. A communication processing unit 307 performs a communication process between the information processing apparatus 102 and the information processing apparatus 101 and between the information processing apparatus 102 and the image forming apparatus 103. A control unit 308 controls processing and communication between the communication processing unit 307 and functional units 309 to 318.

An inquiry transmitting unit 309 transmits, from the information processing apparatus 102 to the information processing apparatus 101, a request for downloading order information. An order receiving unit 310 receives order information transmitted from the order transmitting unit 304 of the information processing apparatus 101. A job storage unit 311 saves job information on the basis of an order received by the order receiving unit 310. A paper information storage unit 312 saves information (paper information) regarding paper used in the image forming apparatus 103. A printer information storage unit 313 stores information (printer information) regarding the image forming apparatus 103. As the printer information, the printer information storage unit 313 saves, for example, the print speed of the image forming apparatus 103, the time taken to change the temperature of a fixing unit of the image forming apparatus 103, and a temperature of the fixing unit necessary for each type of paper.

A print/temperature adjustment estimation calculation unit 314 calculates, for example, an estimated print time, an estimated temperature adjustment time, and the number of times of temperature adjustments necessary for printing of a job by each image forming apparatus 103, on the basis of job information saved in the job storage unit 311. A print/temperature adjustment estimation display unit 315 displays, for example, an estimated print time, an estimated temperature adjustment time, and the number of times of temperature adjustments calculated by the print/temperature adjustment estimation calculation unit 314 on a user interface (UI), such as the display 204. A print sequence change unit 316 changes the print sequence of jobs so as to decrease the temperature adjustment time. A job transmitting unit 317 transmits a job to the image forming apparatus 103. A job inquiry unit 318 receives a change notice, transmitted from the image forming apparatus 103, about a print status regarding a job.

Order Information and Job Information

Now, order information saved in the order storage unit 302 of the information processing apparatus 101 and job information saved in the job storage unit 311 of the information processing apparatus 102 will be described with reference to FIGS. 4A and 4B.

FIG. 4A illustrates examples of order information received by the order receiving unit 301 of the information processing apparatus 101 and stored in the order storage unit 302 according to the first embodiment. In a column 401, an order ID for identifying each order constituting order information is stored. In a column 402, a job ID for identifying a job (print job) included in each order is stored. In a case where one order includes a plurality of jobs, the plurality of jobs having different job IDs are present for the same order ID. In a column 403, a job name for identifying the name of each job is stored.

In a column 404, the number of pages of each job is stored. In a column 405, the number of copies of each job is stored. In a column 406, the name (paper name) of paper used in printing of each job is stored. In a column 407, a file path for identifying a document file of each job is stored. The document file is, for example, a Portable Document Format (PDF) file or a PostScript file.

FIG. 4B illustrates examples of job information downloaded from the information processing apparatus 101 by the information processing apparatus 102 and stored in the job storage unit 311 according to the first embodiment. In a column 411, an order ID for identifying each order constituting job information is stored. In a column 412, a job ID for identifying a job included in each order is stored. In a column 413, a job name for identifying the name of each job is stored.

In a column 414, the name of a target printer for each job is stored. The target printer is determined by the user operating a job table 1204 on a job management screen 1201 described below. In a column 415, the print status of each job is stored. The print status is determined by the information processing apparatus 102 on the basis of a change notice from the image forming apparatus 103 received by the job inquiry unit 318. For example, "Ready" is indicated as the print status in a case where the job is in a print queue. In response to transmission of a job to the image forming apparatus 103, the print status transitions to "Processing", which means that printing is in progress. For a job for which printing is completed, "Completed" is indicated. In a column 416, the date and time when printing of each job is completed (print completion date and time) is stored. In a case where printing is not completed, nothing is stored in the column 416.

In a column 417, the number of pages of each job is stored. In a column 418, the number of copies of each job is stored. In a column 419, the name (paper name) of paper used in printing of each job is stored. In a column 420, a file path for identifying a document file of each job is stored.

Paper Information

Figure 5:
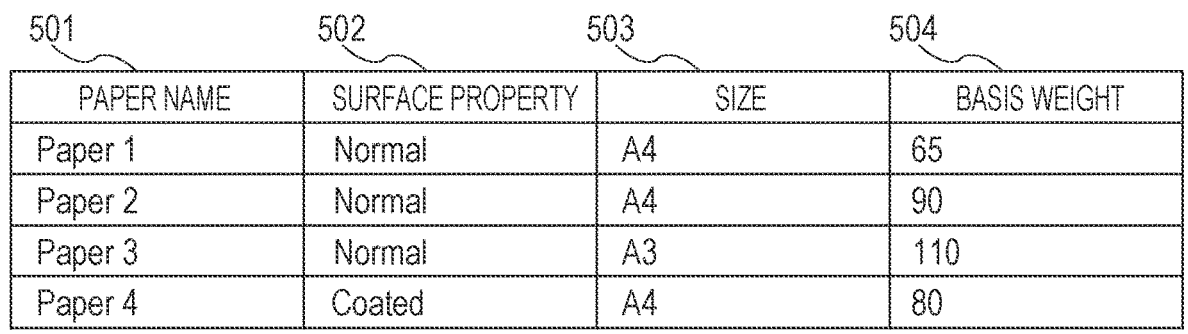
FIG. 5 illustrates examples of paper information according to the first embodiment.

Now, information (paper information) regarding paper used in the image forming apparatus 103, the information being saved in the paper information storage unit 312 of the information processing apparatus 102, will be described with reference to FIG. 5. FIG. 5 illustrates examples of paper information according to the first embodiment. Paper information is stored as information that is defined in advance by the user.

In a column 501, the name of paper (paper name) is stored. In a column 502, the surface property of paper (paper surface property) is stored. For example, in a case where paper is normal paper, "Normal" is stored. In a case where paper is coated paper, "Coated" is stored. In a column 503, the size of paper (paper size) is stored. In a column 504, the basis weight of paper (paper basis weight) is stored.

Printer Information

Now, information (printer information) regarding the image forming apparatus 103, the information being saved in the printer information storage unit 313 of the information processing apparatus 102, will be described with reference to FIGS. 6A to 6C. The printer information is information set in advance by the manufacturer of the printing apparatus.

FIG. 6A illustrates examples of printer information stored on the information processing apparatus 102 according to the first embodiment. In a column 601, the name (printer name) of each image forming apparatus (printer) 103 connected to the information processing apparatus 102 is stored. In a column 602, the model name (printer model) of each printer is stored.

FIG. 6B illustrates examples of detailed information regarding printer models according to the first embodiment. In a column 611, the model name (printer model) of each printer is stored. In a column 612, the time taken to increase the temperature of a fixing unit in each printer model by 1° C. is stored. The time is indicated in seconds. In a column 613, the time taken to decrease the temperature of a fixing unit in each printer model by 1° C. is stored. The time is indicated in seconds. In a column 614, the print speed of each printer model is stored.

FIG. 6C illustrates examples of information regarding a temperature of the fixing unit (fixing temperature) necessary for printing on paper, for each printer model stored on the information processing apparatus 102 according to the first embodiment. In a column 621, the model name (printer model) of each printer is stored. In a column 622, the surface property of paper (paper surface property) used in each printer model is stored. In a column 623, the basis weight of paper (paper basis weight) used in each printer model is stored. The basis weight of paper to be used has a value within a range specified in the column 623. In a column 624, a fixing temperature necessary for printing on paper corresponding to a corresponding surface property in the column 622 and a corresponding basis weight in the column 623, in a corresponding printer model defined in the column 621 is stored. In this embodiment, a combination of a printer model in the column 621, a corresponding paper surface property in the column 622, and a corresponding paper basis weight in the column 623 is defined as "paper pattern".

Overall Flow of Print Process

Figure 7:
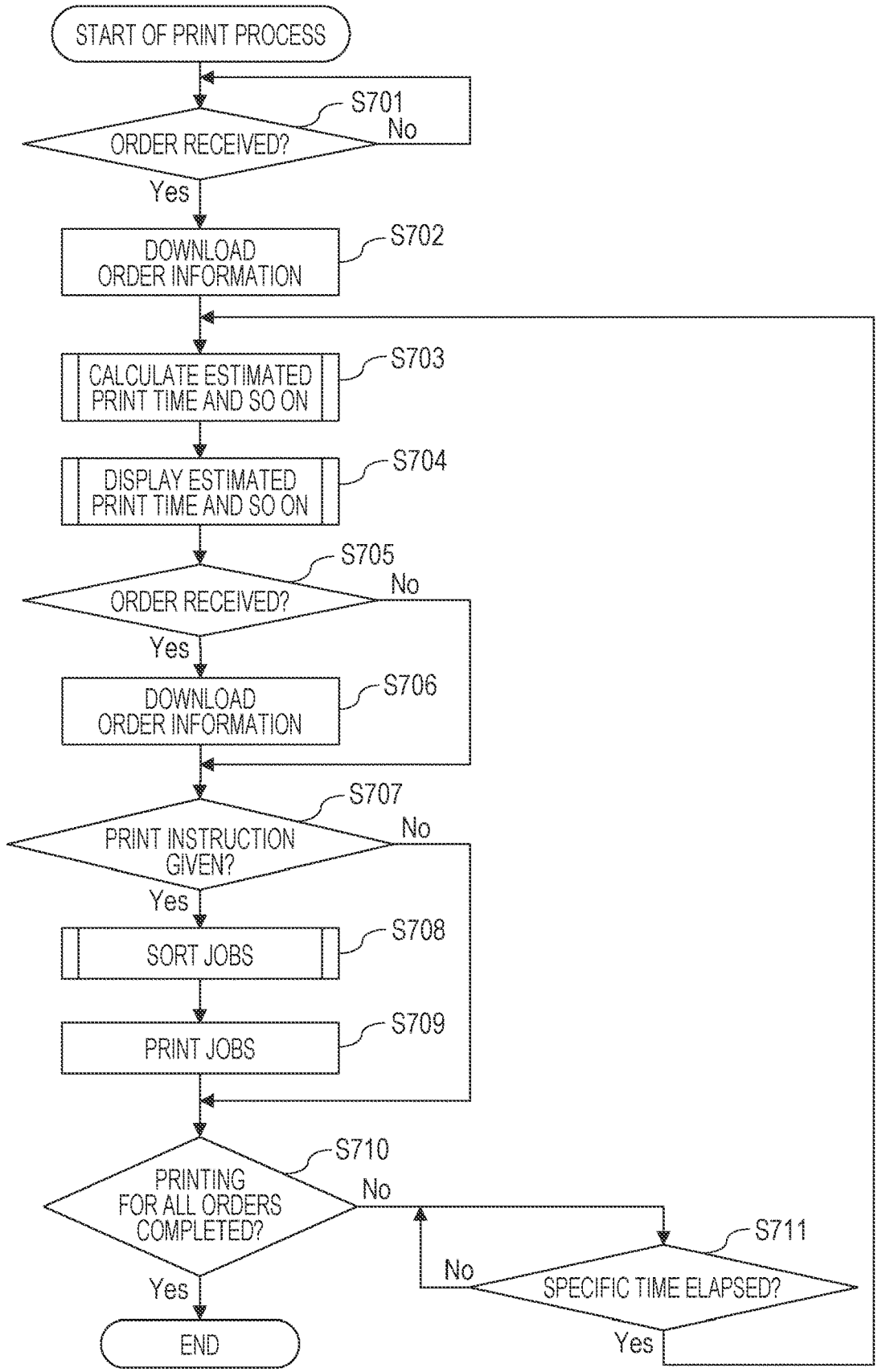
FIG. 7 is a flowchart illustrating an overall print process according to the first embodiment.

FIG. 7 is a flowchart illustrating an example overall flow of a print process from when an order is accepted to when printing is completed in the printing system 100 according to the first embodiment. In S701, the information processing apparatus 102 determines whether the information processing apparatus 101 has received a new order. When the order receiving unit 301 has accepted an order, the information processing apparatus 101 saves order information in the order storage unit 302. The inquiry transmitting unit 309 of the information processing apparatus 102 determines, via the communication processing unit 307, whether a new order has been accepted by the information processing apparatus 101. In a case where the information processing apparatus 102 determines that the information processing apparatus 101 has received a new order, the flow proceeds to S702. In a case where reception is not confirmed, the information processing apparatus 102 waits for a new order to be accepted.

In S702, the information processing apparatus 102 downloads the order information from the information processing apparatus 101. The inquiry transmitting unit 309 of the information processing apparatus 102 transmits, to the inquiry receiving unit 303 of the information processing apparatus 101, a request for downloading the order information. When the inquiry receiving unit 303 receives the request, the order transmitting unit 304 transmits the order information saved in the order storage unit 302 to the information processing apparatus 102. When the order receiving unit 310 receives the order information, the information processing apparatus 102 saves the order information in the job storage unit 311.

In S703, the print/temperature adjustment estimation calculation unit 314 of the information processing apparatus 102 calculates the estimated print time, the estimated temperature adjustment time, and the number of times of temperature adjustments for each image forming apparatus 103 (printer) on the basis of the job information saved in the job storage unit 311. The calculation process for the estimated print time and so on in S703 will be described in detail below with reference to FIG. 8.

In S704, the print/temperature adjustment estimation display unit 315 of the information processing apparatus 102 displays on the UI, the estimated print time, the estimated temperature adjustment time, and the number of times of temperature adjustments calculated in S703 and so on. The display process for the estimated print time and so on in S704 will be described in detail below with reference to FIG. 10. A screen displayed here will be described below with reference to FIG. 13.

In S705, the information processing apparatus 102 determines again whether the information processing apparatus 101 has received an order. The details of the process in S705 are the same as those in S701. In a case where the information processing apparatus 102 determines that the information processing apparatus 101 has received a new order, the flow proceeds to S706. In a case where reception is not confirmed, the flow proceeds to S707. In S706, the information processing apparatus 102 downloads order information from the information processing apparatus 101. The details of the process in S706 are the same as those in S702.

In S707, the information processing apparatus 102 determines whether the user has given a print instruction for jobs. A screen displayed for the user to give a print instruction in S707 will be described below with reference to FIG. 12. The user gives a print instruction for jobs while viewing this screen (the job management screen 1201 in FIG. 12). In a case where a print instruction has been given, the flow proceeds to S708. In a case where a print instruction has not been given, the flow proceeds to S710.

In S708, the information processing apparatus 102 sorts the jobs. The sort process for the jobs is a process, to be performed before printing, for changing the sequence in which the jobs are to be transmitted in order to decrease the number of times of temperature adjustments to be made at the time of printing. The sort process for the jobs in S708 will be described in detail below with reference to FIG. 11.

In S709, the job transmitting unit 317 of the information processing apparatus 102 transmits the jobs to the image forming apparatus 103. The image forming apparatus 103 performs printing of the jobs.

In S710, the information processing apparatus 102 determines whether printing for all orders is completed. Specifically, the information processing apparatus 102 determines whether all print statuses saved in the job storage unit 311 are indicated as "Completed". In a case where all print statuses are indicated as "Completed", the flow in FIG. 7 ends. In a case where there is a print status for which "Completed" is not indicated, the flow proceeds to S711. In S711, the information processing apparatus 102 waits for a specific time. After the elapse of the specific time, the flow returns to S703.

Calculation Process for Estimated Print Time and So On

Figure 8:
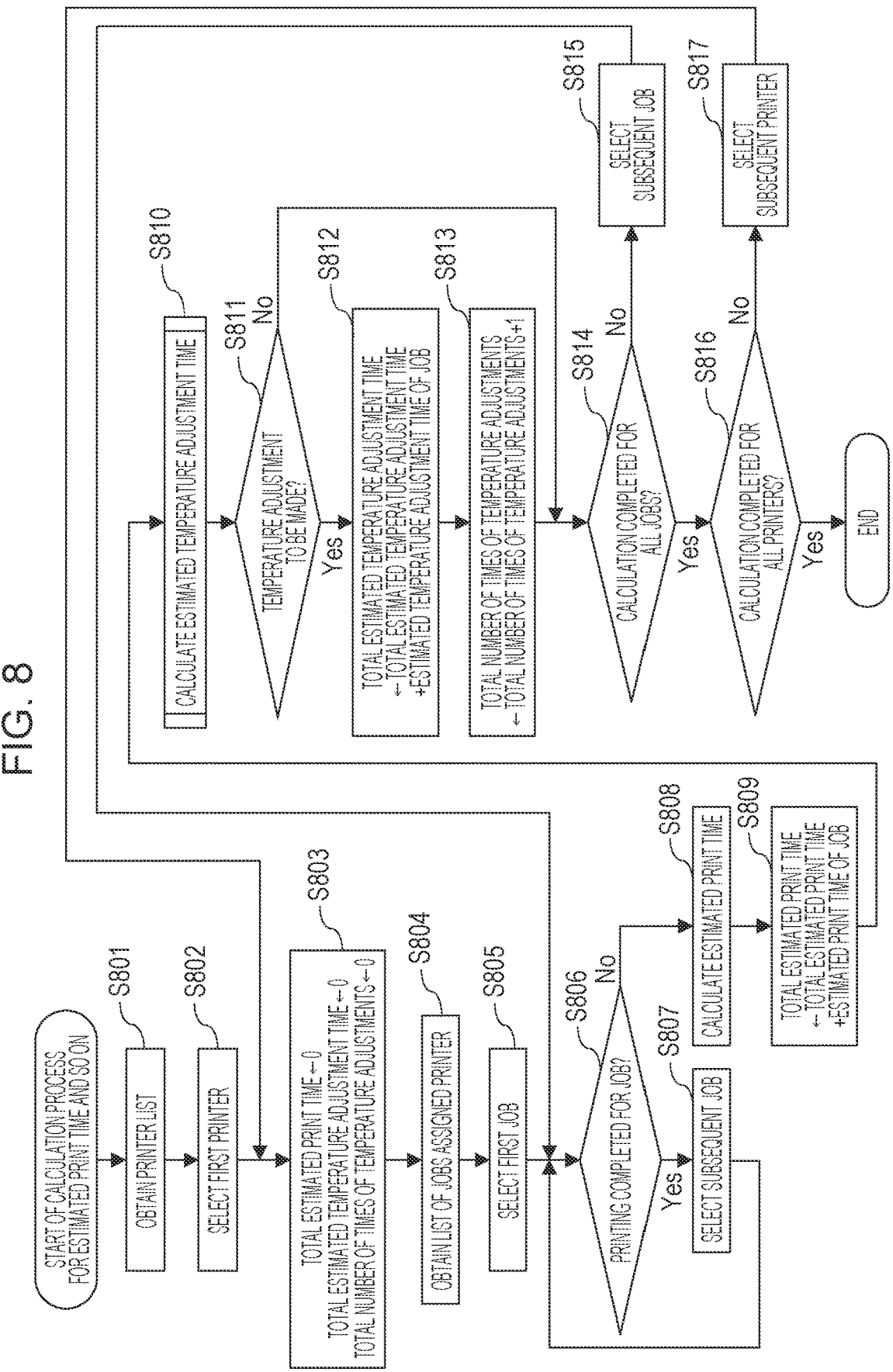
FIG. 8 is a flowchart illustrating a calculation process for an estimated print time and so on according to the first embodiment.

FIG. 8 is a flowchart illustrating the details of the calculation process for the estimated print time and so on performed in S703 according to the first embodiment. This process is performed by the CPU 201 of the information processing apparatus 102 functioning as the print/temperature adjustment estimation calculation unit 314.

In S801, the CPU 201 obtains all printer names 601 saved in the printer information storage unit 313 of the information processing apparatus 102, as a printer list. In S802, the CPU 201 selects the first printer name from the printer list obtained in S801.

In S803, the CPU 201 resets each of the total estimated print time, the total estimated temperature adjustment time, and the total number of times of temperature adjustments to zero for the image forming apparatus 103 (printer) selected in S802. In S804, the CPU 201 obtains, from jobs saved in the job storage unit 311, all jobs that are assigned the target printer 414 the same as the printer selected in S802, as a job list. This embodiment assumes that jobs are printed in the sequence in which the jobs are saved in the job storage unit 311. In S805, the CPU 201 selects the first job from the job list obtained in S804.

In S806, the CPU 201 determines whether the print status 415 of the job selected in S805 is "Completed" indicating print completion. In a case where the print status 415 indicates print completion, the flow proceeds to S807. In a case where the print status 415 does not indicate print completion, the flow proceeds to S808.

In S807, the CPU 201 selects the job subsequent to the job selected in S805 from the job list obtained in S804. Subsequently, the flow returns to S806.

In S808, the CPU 201 calculates the estimated print time of the job selected in S805 or S807. The estimated print time is calculated by dividing the number of printed sheets obtained by multiplying the number of pages 417 by the number of copies 418 saved in the job storage unit 311, by the print speed 614 saved in the printer information storage unit 313. In S809, the CPU 201 adds the estimated print time calculated in S808 to the total estimated print time of the selected printer.

In S810, the CPU 201 calculates the estimated temperature adjustment time of the job selected in S805 or S807. The calculation process for the estimated temperature adjustment time in S810 will be described in detail below with reference to FIG. 9. In S811, the CPU 201 determines whether a temperature adjustment is to be made from the estimated temperature adjustment time calculated in S810. In a case where a temperature adjustment is to be made, the flow proceeds to S812. In a case where a temperature adjustment is not to be made, the flow proceeds to S814.

In S812, the CPU 201 adds the estimated temperature adjustment time calculated in S810 to the total estimated temperature adjustment time of the selected printer. In S813, the CPU 201 increments the total number of times of temperature adjustments of the selected printer by one.

In S814, the CPU 201 determines whether calculation of the estimated print time, the estimated temperature adjustment time, and the number of times of temperature adjustments is completed for all jobs obtained in S804 for the selected printer. In a case where calculation of the estimated print time, the estimated temperature adjustment time, and the number of times of temperature adjustments is completed for all jobs, the flow proceeds to S816. In a case where calculation is not completed, the flow proceeds to S815. In S815, the CPU 201 selects the job subsequent to the previously selected job from the job list obtained in S804. The flow returns to S806.

In S816, the CPU 201 determines whether calculation of the total estimated print time, the total estimated temperature adjustment time, and the total number of times of temperature adjustments is completed for all jobs for all printers obtained in S801. In a case where calculation of the total estimated print time, the total estimated temperature adjustment time, and the total number of times of temperature adjustments is completed for all printers, the flow in FIG. 8 ends. In a case where there is a printer for which calculation of the total estimated print time, the total estimated temperature adjustment time, and the total number of times of temperature adjustments is not completed, the flow proceeds to S817. In S817, the CPU 201 selects the printer subsequent to the previously selected printer from the printer list obtained in S801. The flow returns to S803.

Calculation Process for Estimated Temperature Adjustment Time

Figure 9:
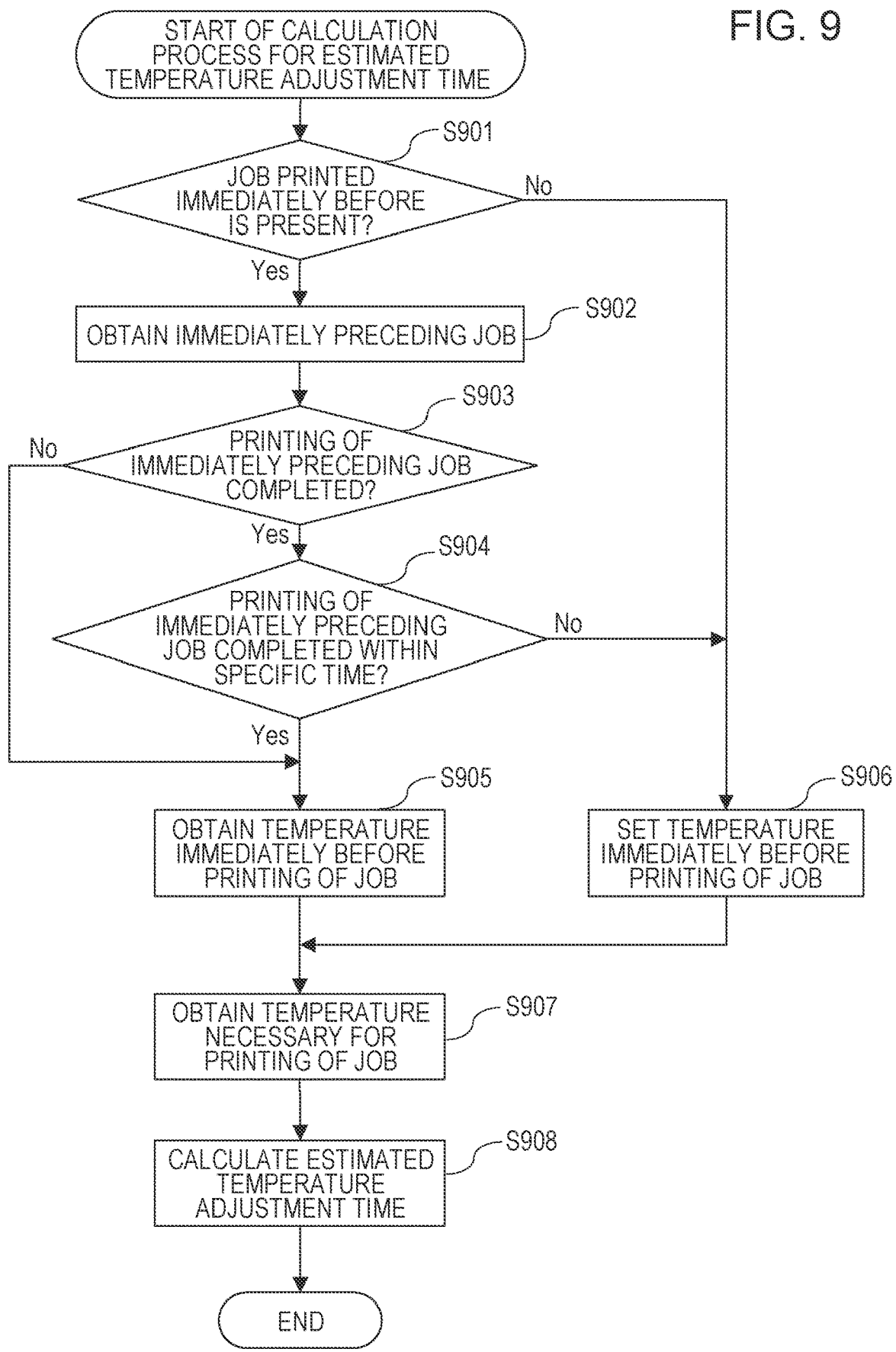
FIG. 9 is a flowchart illustrating a calculation process for an estimated temperature adjustment time according to the first embodiment.

FIG. 9 is a flowchart illustrating the details of the calculation process for the estimated temperature adjustment time performed in S810 according to the first embodiment. This process is performed by the CPU 201 of the information processing apparatus 102 functioning as the print/temperature adjustment estimation calculation unit 314. In the calculation process for the estimated temperature adjustment time, for the printer selected in S802 or S817, the time taken for a temperature adjustment to be made immediately before printing of the job selected in S805, S807, or S815 is calculated.

In S901, the CPU 201 determines whether the job immediately preceding the selected job is present in the job list obtained in S804. That is, the CPU 201 determines whether the selected job is the first job in the job list obtained in S804. In a case where the immediately preceding job is present, the flow proceeds to S902. In a case where the immediately preceding job is not present, the flow proceeds to S906.

In S902, the CPU 201 obtains the immediately preceding job determined in S901 from the job list obtained in S804. In S903, the CPU 201 determines whether the print status 415 of the immediately preceding job obtained in S902 is "Completed" indicating print completion. In a case where the print status 415 indicates print completion, the flow proceeds to S904. In a case where the print status 415 does not indicate print completion, the flow proceeds to S905.

In S904, the CPU 201 determines whether the print completion date and time 416 of the immediately preceding job obtained in S902 is within a threshold range from the current time. It is assumed that the threshold is defined by the manufacturer of the printing apparatus and saved in advance on the information processing apparatus 102. This is based on an idea that even when a job for which printing by the printer is in progress is not present currently, it is considered that the temperature of the fixing unit does not change from the temperature at the time of printing performed immediately before as long as the time elapsed since printing of the last job is within a specific time. In a case where the current time is within the specific time after completion of the immediately preceding job, the flow proceeds to S905. Otherwise, the flow proceeds to S906.

In S905, the CPU 201 obtains the temperature of the fixing unit immediately before printing of the selected job on the basis of the immediately preceding job obtained in S902 and paper information stored in the paper information storage unit 312. Specifically, on the basis of the paper name 419 of the immediately preceding job obtained in S902, the CPU 201 obtains the paper surface property 502 and the paper basis weight 504 saved in the paper information storage unit 312. Next, the CPU 201 obtains a paper pattern that corresponds to the printer model of the selected printer, the surface property, and the paper basis weight from the printer information storage unit 313 and obtains the fixing temperature 624 necessary for printing. The CPU 201 defines the fixing temperature 624 obtained here as the temperature of the fixing unit immediately before printing of the selected job.

In S906, the CPU 201 sets a temperature of the fixing unit defined in advance, as the temperature of the fixing unit immediately before printing of the selected job. It is assumed that this temperature is set by the manufacturer of the printing apparatus and saved in advance on the information processing apparatus 102.

In S907, the CPU 201 calculates a temperature of the fixing unit necessary for printing the selected job. Specifically, the CPU 201 obtains the paper surface property 502 and the paper basis weight 504 saved in the paper information storage unit 312 on the basis of the paper name 419 of the selected job. The CPU 201 obtains a paper pattern that corresponds to the model of the selected printer, the paper surface property, and the paper basis weight from the printer information storage unit 313 and obtains the fixing temperature 624 necessary for printing.

In S908, to calculate the estimated temperature adjustment time, the CPU 201 calculates the difference between the temperature of the fixing unit immediately before printing of the selected job, the temperature being obtained in S905 or S906, and the temperature of the fixing unit necessary for printing the selected job, the temperature being obtained in S907. In a case where the temperature of the fixing unit necessary for printing the selected job is higher than the temperature of the fixing unit immediately before printing of the selected job, the CPU 201 sets a value obtained by multiplying the difference by the value in the column 612 (the time taken to increase the temperature of the fixing unit by 1° C.) as the estimated temperature adjustment time. On the other hand, in a case where the temperature of the fixing unit necessary for printing the selected job is lower than the temperature of the fixing unit immediately before printing of the selected job, the CPU 201 sets a value obtained by multiplying the difference by the value in the column 613 (the time taken to decrease the temperature of the fixing unit by 1° C.) as the estimated temperature adjustment time. In a case where there is no difference between the temperatures, the CPU 201 determines that no temperature adjustment is to be made, and sets the estimated temperature adjustment time to zero. Then, the flow in FIG. 9 ends.

Display Process for Estimated Print Time and So On

Figure 10:
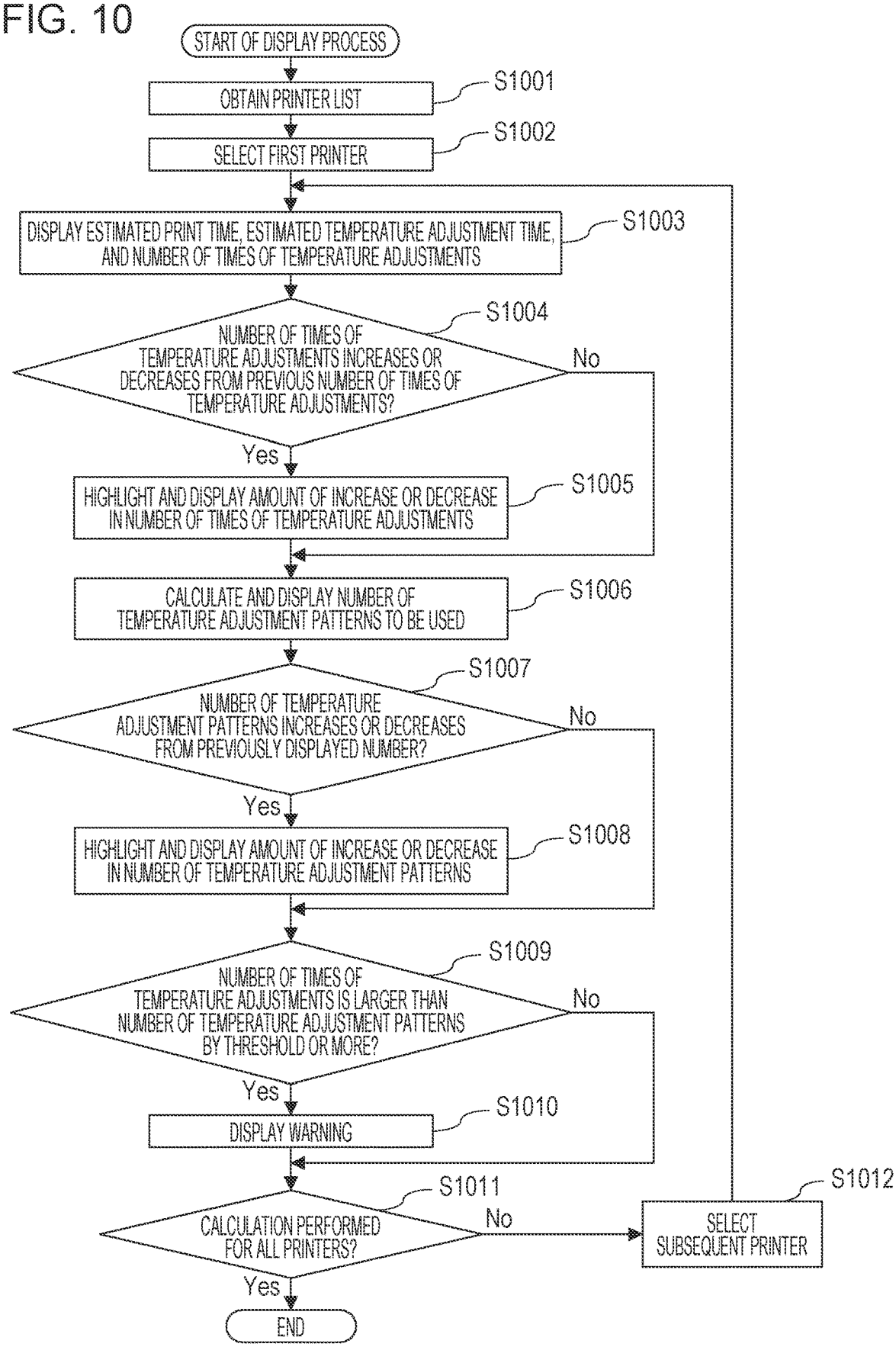
FIG. 10 is a flowchart illustrating a display process for an estimated print time and so on according to the first embodiment.

FIG. 10 is a flowchart illustrating the details of the process for displaying the estimated print time, the estimated temperature adjustment time, the number of times of temperature adjustments, and so on performed in S704 according to the first embodiment. This process is performed by the CPU 201 of the information processing apparatus 102 functioning as the print/temperature adjustment estimation display unit 315.

In S1001, the CPU 201 obtains all printer names 601 from the printer information storage unit 313 as a printer list. In S1002, the CPU 201 selects the first printer from the printer list obtained in S1001.

In S1003, the CPU 201 displays the estimated print time, the estimated temperature adjustment time, and the number of times of temperature adjustments of the selected printer calculated in S703 on the display 204 of the information processing apparatus 102.

In S1004, the CPU 201 compares the number of times of temperature adjustments displayed immediately before in S1003 and the number of times of temperature adjustments displayed this time with each other. In a case where the number of times of temperature adjustments displayed this time increases or decreases from the number of times of temperature adjustments displayed immediately before by a specific number, the flow proceeds to S1005. Otherwise, the flow proceeds to S1006. In S1005, the CPU 201 highlights and displays the amount of increase or decrease in the number of times of temperature adjustments calculated in S1004. The highlight display is performed by, for example, displaying text in color on the UI.

In S1006, the CPU 201 calculates the number of temperature adjustment patterns to be used in the selected printer and displays the calculated number of temperature adjustment patterns. Specifically, the CPU 201 obtains, from the job storage unit 311, all jobs for each of which the print status 415 is "Ready" indicating that the job is in a print queue, and that are assigned the target printer 414 the same as the selected printer. Next, the CPU 201 obtains the paper names 419 of the obtained jobs and obtains the paper surface properties 502 and the paper basis weights 504 from the paper information storage unit 312. The CPU 201 obtains paper patterns that correspond to the model of the selected printer, the paper surface properties, and the paper basis weights from the printer information storage unit 313. The CPU 201 defines, from the obtained paper patterns, paper patterns for which the fixing temperatures 624 are the same, as a temperature adjustment pattern, and calculates the number of temperature adjustment patterns.

In S1007, the CPU 201 determines whether the number of temperature adjustment patterns displayed in S1006 increases or decreases from the number of temperature adjustment patterns displayed immediately before. In a case where the number of temperature adjustment patterns increases or decreases, the flow proceeds to S1008. In a case where the number of temperature adjustment patterns does not increase or decrease, the flow proceeds to S1009. In S1008, the CPU 201 highlights and displays the amount of increase or decrease in the number of temperature adjustment patterns calculated in S1007. The highlight displays is performed by, for example, displaying text in color on the UI.

In S1009, the CPU 201 compares the number of times of temperature adjustments displayed in S1003 and the number of temperature adjustment patterns displayed in S1006 with each other to determine whether the numbers satisfy a specific condition. Specifically, the CPU 201 determines whether the number of times of temperature adjustments is larger than the number of temperature adjustment patterns by a threshold or more. The threshold is set by the manufacturer of the printing apparatus and saved in advance on the information processing apparatus 102. In a case where the number of times of temperature adjustments is larger than the number of temperature adjustment patterns by the threshold or more, the flow proceeds to S1010. Otherwise, the flow proceeds to S1011. In S1010, the CPU 201 gives a warning to the user (operator). The warning is given by, for example, displaying a warning icon and displaying a warning message stating that changing of the print sequence is recommended because the number of times of temperature adjustments is large. The warning icon and the warning message displayed here will be described below with reference to FIG. 13.

In S1011, the CPU 201 determines whether the process form S1003 to S1010 has been performed for all printers obtained in S1001. In a case where the process has been performed for all printers, the flow in FIG. 10 ends. In a case where there is a printer for which the process is not yet performed, the flow proceeds to S1012. In S1012, the CPU 201 selects the printer subsequent to the previously selected printer from the printer list obtained in S1001.

Sort Process for Jobs

Figure 11:
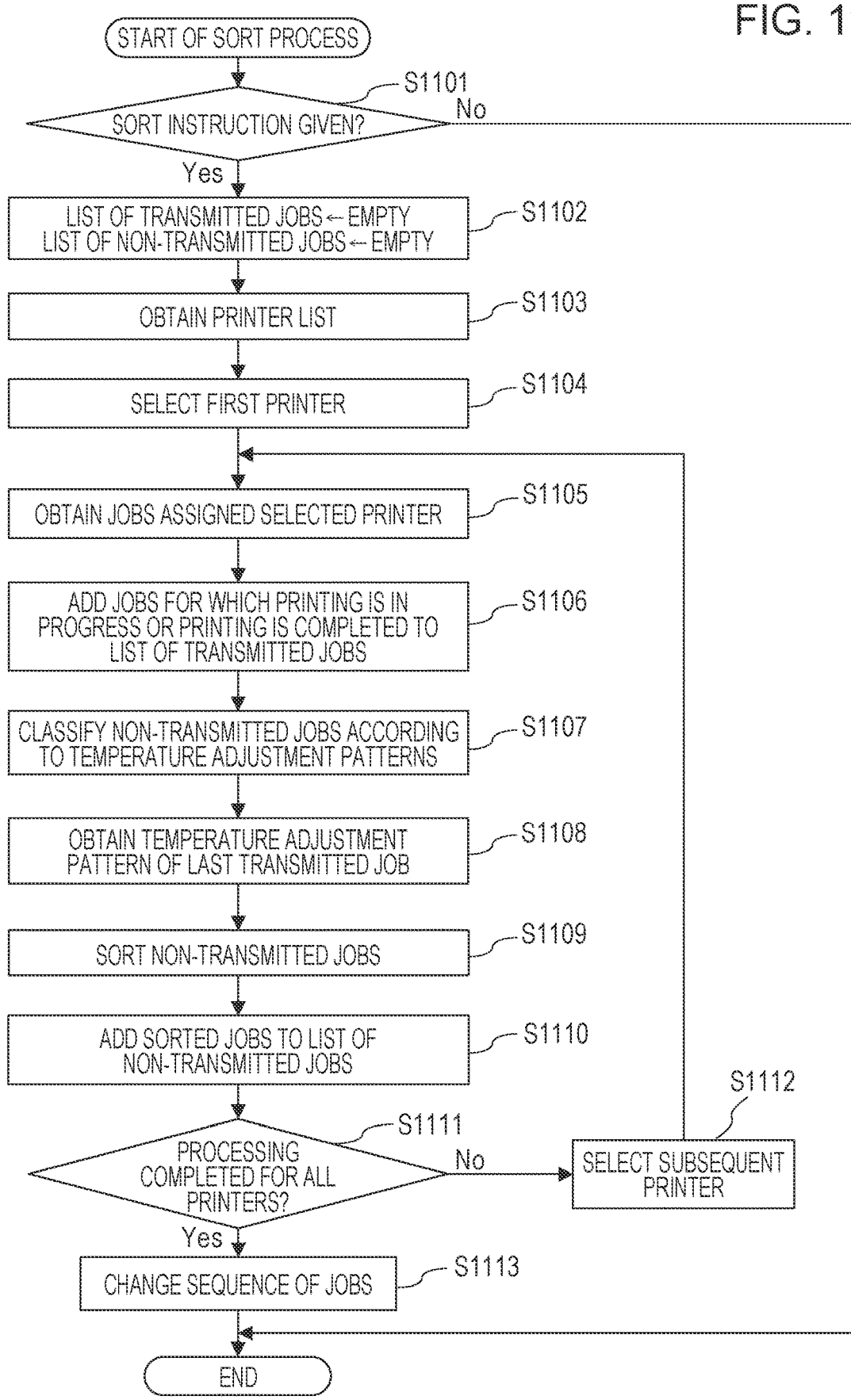
FIG. 11 is a flowchart illustrating a sort process for jobs according to the first embodiment.

FIG. 11 is a flowchart illustrating the details of the sort process for jobs performed in S708 according to the first embodiment. This process is performed by the CPU 201 of the information processing apparatus 102 functioning as the print sequence change unit 316. At the time of printing, the user sorts jobs so as not to make a temperature adjustment to the extent possible. However, for jobs that have already been transmitted to the printer, it is not possible to change the print sequence, and therefore, the user needs to determine the print sequence of jobs that are not yet transmitted, by taking into consideration the sequence of the jobs that have already been transmitted. When the sort process for such jobs is performed, the user can perform printing while reducing the number of times of temperature adjustments.

In S1101, the CPU 201 determines whether the user has given a sort instruction for the print sequence of jobs. In a case where a sort instruction has been given, the flow proceeds to S1102. In a case where a sort instruction has not been given, the flow in FIG. 11 ends. In S1102, the CPU 201 prepares a list of transmitted jobs and a list of non-transmitted jobs. These lists are initially empty. The lists are work lists for changing the print sequence of jobs.

In S1103, the CPU 201 obtains a list of the printer names 601 from the printer information storage unit 313 as a printer list. In S1104, the CPU 201 selects the first printer from the printer list obtained in S1103.

In S1105, the CPU 201 obtains all jobs that are assigned the target printer 414 the same as the selected printer from jobs saved in the job storage unit 311. In S1106, the CPU 201 obtains all jobs for each of which the print status 415 is "Completed" indicating that printing is completed or "Processing" indicating that printing is in progress. The CPU 201 adds the obtained transmitted jobs to the list of transmitted jobs.

In S1107, the CPU 201 obtains, from the jobs obtained in S1105, all jobs for each of which the print status 415 is "Ready" indicating that the job is in a print queue. For each of the obtained non-transmitted jobs, the CPU 201 obtains the paper surface property 502 and the paper basis weight 504. On the basis of these pieces of information and information regarding the target printer 414 of the jobs, the CPU 201 obtains the temperature adjustment patterns of the non-transmitted jobs and classifies the non-transmitted jobs according to the temperature adjustment patterns.

In S1108, the CPU 201 obtains the temperature adjustment pattern of the transmitted job transmitted last to the printer. Specifically, the CPU 201 obtains the job stored last from jobs stored in the list of transmitted jobs. The CPU 201 obtains the paper surface property 502 and the paper basis weight 504 of the obtained last transmitted job. On the basis of these pieces of information and information regarding the target printer 414 of the last transmitted job, the CPU 201 obtains the temperature adjustment pattern of the last transmitted job.

In S1109, the CPU 201 sorts the non-transmitted jobs on the basis of the temperature adjustment patterns obtained in S1107 and S1108. The CPU 201 sorts the non-transmitted jobs as follows. The CPU 201 obtains, from the printer information storage unit 313, the time 612 taken to increase the fixing temperature of the selected printer by 1° C. and the time 613 taken to decrease the fixing temperature of the selected printer by 1° C. and defines the time 612 and the time 613 as $\alpha$ and $\beta$ respectively. Next, the CPU 201 obtains the highest fixing temperature and the lowest fixing temperature from the non-transmitted jobs classified according to the temperature adjustment patterns in S1107 and defines the highest fixing temperature and the lowest fixing temperature as X and Y respectively. Next, the CPU 201 obtains the fixing temperature for the last transmitted job obtained in S1108 and defines the fixing temperature as Z.

The CPU 201 calculates values of expression A and expression B below. Expression A is an expression that expresses the time taken to change the temperature of the fixing unit in a case where printing is performed such that the fixing temperature is increased first, and thereafter, the fixing temperature falls. Expression B is an expression that expresses the time taken to change the temperature of the fixing unit in a case where printing is performed such that the fixing temperature is decreased first, and thereafter, the fixing temperature rises.

$$(X-Z)\alpha+(X-Y)\beta \quad \text{Expression A}$$

$$(Z-Y)\beta+(X-Y)\alpha \quad \text{Expression B}$$

The CPU 201 sorts the non-transmitted jobs obtained in S1107 in ascending order of fixing temperature in a case where the value of expression A is larger. Otherwise, the CPU 201 sorts the non-transmitted jobs obtained in S1107 in descending order of fixing temperature. In S1110, the CPU 201 adds the non-transmitted jobs sorted in S1109 to the list of non-transmitted jobs.

In S1111, the CPU 201 determines whether the process from S1105 to S1110 is completed for all printers. In a case where the process is completed, the flow proceeds to S1113. In a case where the process is not completed, the flow proceeds to S1112.

In S1112, the CPU 201 selects the subsequent printer from the printer list obtained in S1103. The flow returns to S1105. In S1113, the CPU 201 changes the print sequence of jobs stored in the job storage unit 311 on the basis of the content of the list of non-transmitted jobs and the content of the list of transmitted jobs. Specifically, the CPU 201 moves the jobs included in the list of transmitted jobs to the top in the job storage unit 311 and moves the jobs included in the list of non-transmitted jobs to the bottom in the job storage unit 311. That is, the CPU 201 changes the sequence of jobs in the job storage unit 311 such that the jobs in the list of non-transmitted jobs come after the jobs in the list of transmitted jobs. Then, the flow ends.

Job Management Screen

Figure 12:
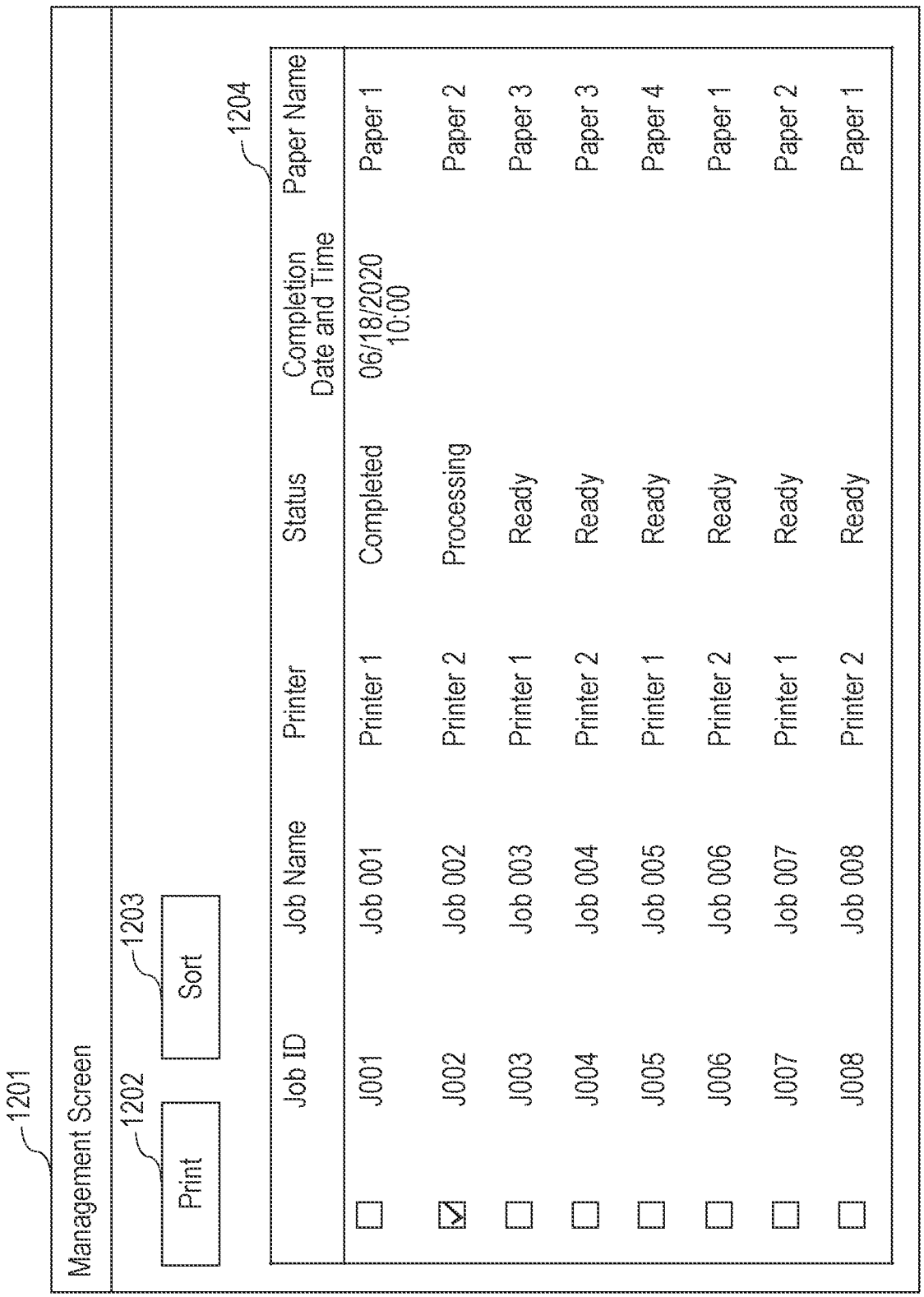
FIG. 12 illustrates an example of a job management screen according to the first embodiment.

FIG. 12 illustrates an example of the job management screen 1201 displayed on, for example, the display 204 of the information processing apparatus 102 according to the first embodiment. The user gives an instruction for printing jobs while viewing the job management screen 1201. A print button 1202 is a button for performing printing of jobs selected in the job table 1204 described below. A sort button 1203 is a button for giving an instruction for sorting jobs displayed in the job table 1204. The job table 1204 displays a list of jobs saved in the job storage unit 311. The user selects jobs that the user wants to print from the job table 1204 and presses the print button 1202 to thereby print the jobs.

Estimated Print Time Display Screen

Figure 13:
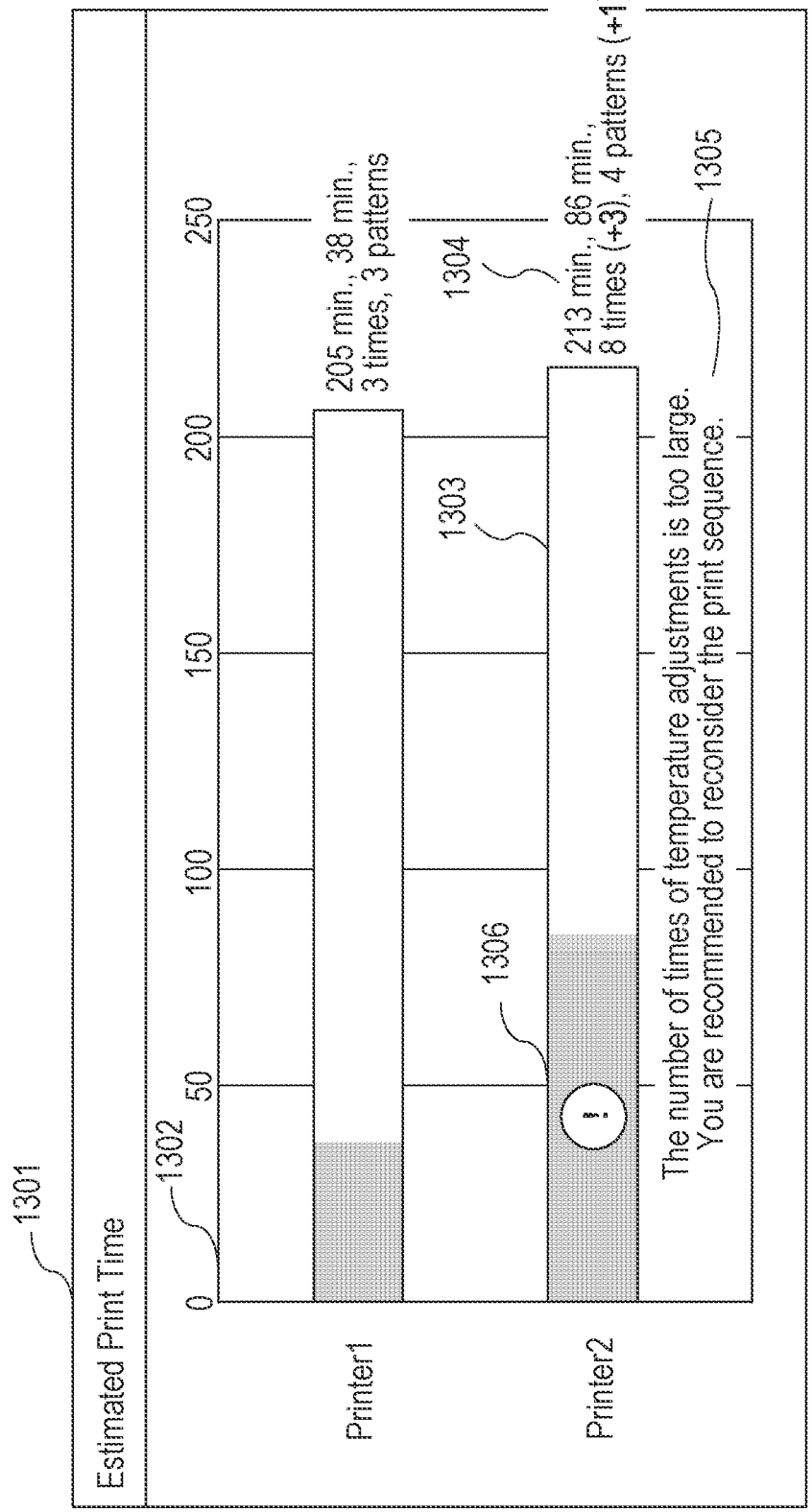
FIG. 13 illustrates an example of an estimated print time display screen according to the first embodiment.

Last, the estimated print time will be described with reference to FIG. 13. FIG. 13 illustrates an example of an estimated print time display screen 1301 displayed on, for example, the display 204 of the information processing apparatus 102 according to the first embodiment. The user gives an instruction for the sort process for jobs with reference to the estimated print time display screen 1301. A graph 1302 is a graph for showing the estimated print time of each printer. A bar 1303 shows the estimated print time of each printer. Of the estimated print time, the time taken for temperature adjustments, namely, the estimated temperature adjustment time, is displayed in color on the left of the bar.

Detailed information 1304 indicates the estimated print time, the estimated temperature adjustment time, the number of times of temperature adjustments, and the number of temperature adjustment patterns for each printer. In a case where the number of times of temperature adjustments or the number of temperature adjustment patterns is updated, the amount of increase or decrease in the number is highlighted and displayed. In the example in FIG. 13, for example, regarding Printer 2, the estimated print time is 213 minutes, the estimated temperature adjustment time is 86 minutes, the number of times of temperature adjustments is eight, and the number of temperature adjustment patterns is four. It is indicated that the number of times of temperature adjustments and the number of temperature adjustment patterns increase from the respective numbers immediately before by three and one respectively.

A warning message 1305 is a message that is displayed in a case where the number of times of temperature adjustments is larger than the number of temperature adjustment patterns by a threshold or more. In a case where the warning message 1305 is displayed, a warning icon 1306 is also displayed simultaneously.

Second Embodiment

A second embodiment assumes that when the information processing apparatus 102 downloads job information from the information processing apparatus 101, the name of the target printer to be included in the column 414 is set in advance by the information processing apparatus 101. The information processing apparatus 102 performs, for the printer determined by the information processing apparatus 101, printing of jobs in the sequence in which the jobs are downloaded, and calculates the number of times of temperature adjustments in a case where such printing is performed.

At this time, the information processing apparatus 102 calculates only the number of times a temperature adjustment that takes a specific time or more is to be made, gives a warning in a case where the information processing apparatus 102 determines that the number of times of temperature adjustments is large, and asks for confirmation of whether jobs are to be sorted so as to decrease the number of times of temperature adjustments. When the user confirms the warning and gives an instruction for sorting jobs, the information processing apparatus 102 sorts the jobs so as to decrease the number of times of temperature adjustments.

Overall Flow of Print Process

Figure 14:
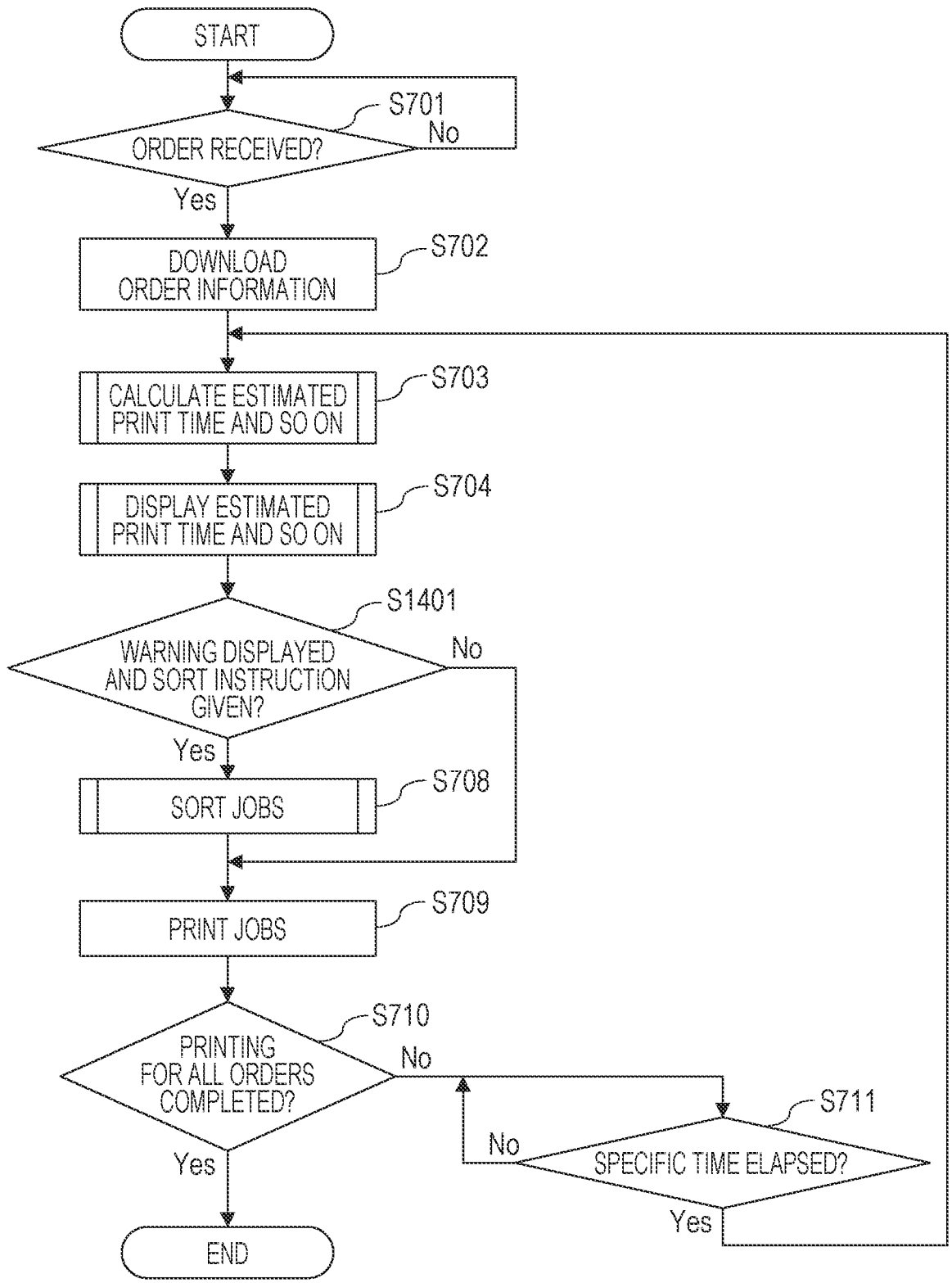
FIG. 14 is a flowchart illustrating an overall print process according to a second embodiment.

FIG. 14 is a flowchart illustrating an example overall flow of a print process from when an order is accepted to when printing is completed in the printing system 100 in the second embodiment.

In S1401, the information processing apparatus 102 determines whether a warning has been displayed in S1010 and in a case where a warning has been displayed, asks the user whether sorting is to be performed. In a case where the user has given a sort instruction, the flow proceeds to S708. In a case where a warning has not been displayed or the user has not given a sort instruction, the flow proceeds to S709.

Calculation Process for Estimated Print Time and So On

Figure 15:
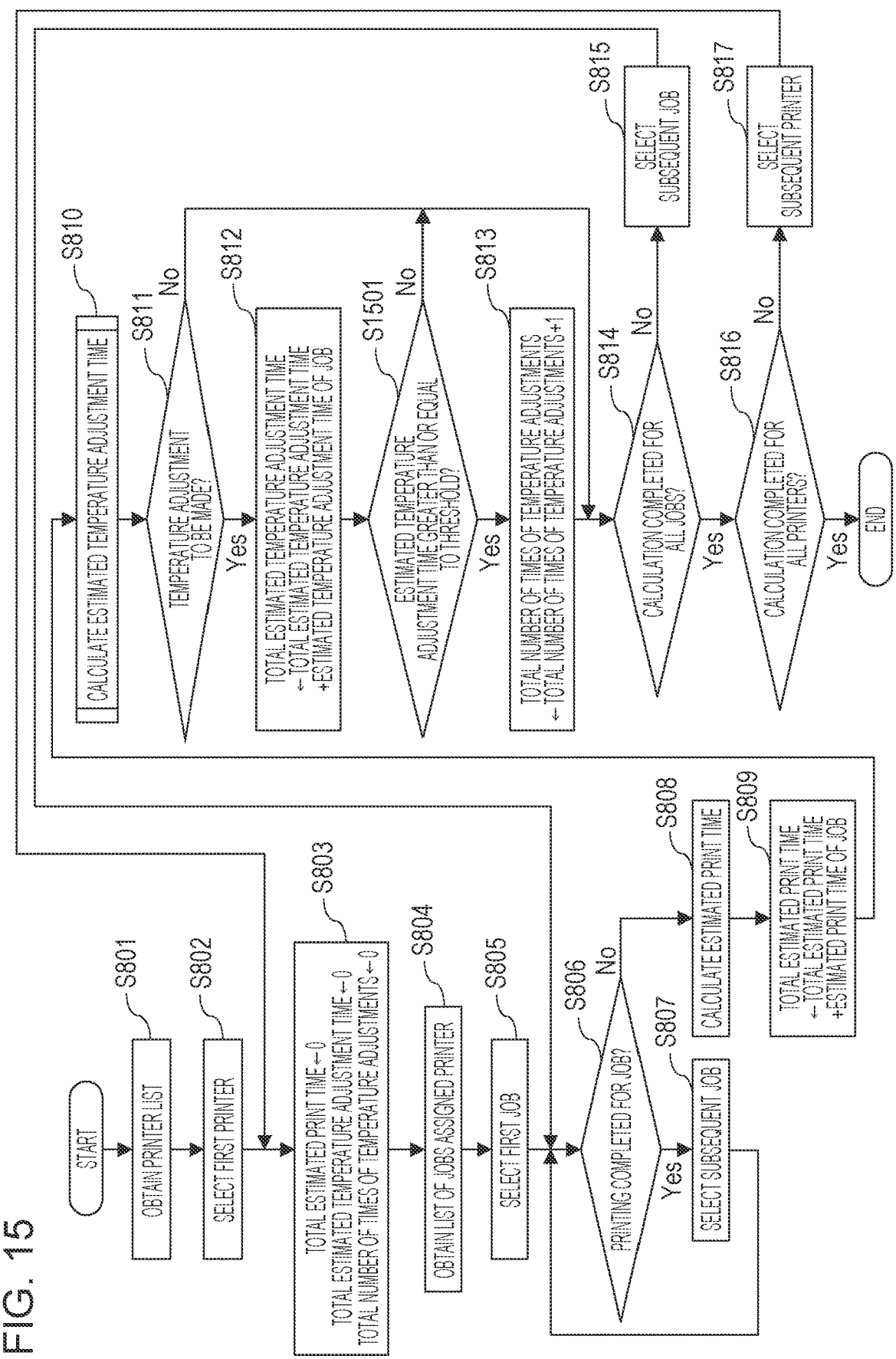
FIG. 15 is a flowchart illustrating a calculation process for an estimated print time and so on according to the second embodiment.

FIG. 15 is a flowchart illustrating the details of the calculation process for the estimated print time and so on performed in S703 in the second embodiment. This process is performed by the CPU 201 of the information processing apparatus 102 functioning as the print/temperature adjustment estimation calculation unit 314. In S1501, the CPU 201 determines whether the estimated temperature adjustment time calculated in S810 is greater than or equal to a threshold. In a case where the estimated temperature adjustment time is greater than or equal to the threshold, the flow proceeds to S813. In a case where the estimated temperature adjustment time is less than the threshold, the flow proceeds to S814. This is because in a case where a temperature adjustment is to be made but does not take much time, the user operation is affected to a small degree, and there is no problem if such a case is not taken into consideration. It is assumed that the threshold is defined by the manufacturer of the printing apparatus or by the user and saved in advance on the information processing apparatus 102.

Estimated Print Time Display Screen

Figure 16:
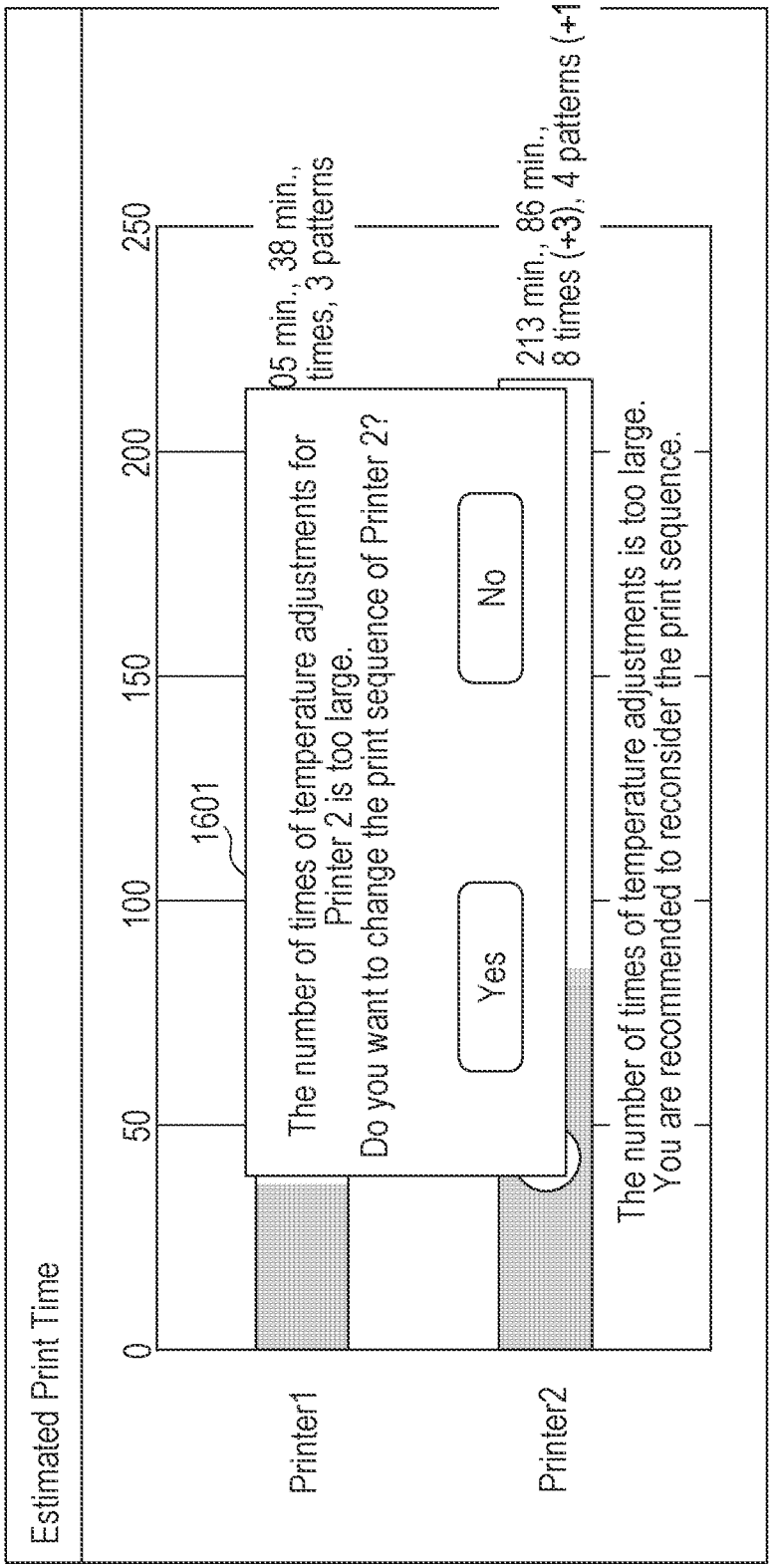
FIG. 16 illustrates an example of the estimated print time display screen according to the second embodiment.

FIG. 16 illustrates an example of the estimated print time display screen displayed on, for example, the display 204 of the information processing apparatus 102 in the second embodiment.

A confirmation message 1601 is a message for asking confirmation of whether jobs are to be sorted so as to decrease the number of times of temperature adjustments in a case where the number of times of temperature adjustments each taking a time longer than a specific time is larger than the number of temperature adjustment patterns by a threshold or more. When the user clicks the "Yes" button, the information processing apparatus 102 performs the process for sorting jobs in S708.

Third Embodiment

In a third embodiment, the information processing apparatus 102 intermittently downloads job information from the information processing apparatus 101 and performs printing. Depending on the intervals at which jobs are downloaded, at the time of downloading, printing of the previously downloaded job may be completed. In this case, there is a possibility that the printer has performed an operation of decreasing the temperature of the fixing unit because a certain time has elapsed since the end of printing.

In this case, even when printing of a job for which paper is the same as that used in the previous printing is performed, the temperature of the fixing unit falls because of the time elapsed since completion of the previous printing, and therefore, a temperature adjustment is to be made. Therefore, calculation of the estimated temperature adjustment time in S810 does not correspond to the actual situation. Taking into consideration the above, in the third embodiment, the estimated temperature adjustment time is calculated by taking into consideration the current temperature of the fixing unit of the printer.

Functional Configurations of Information Processing Apparatuses

Figure 17:
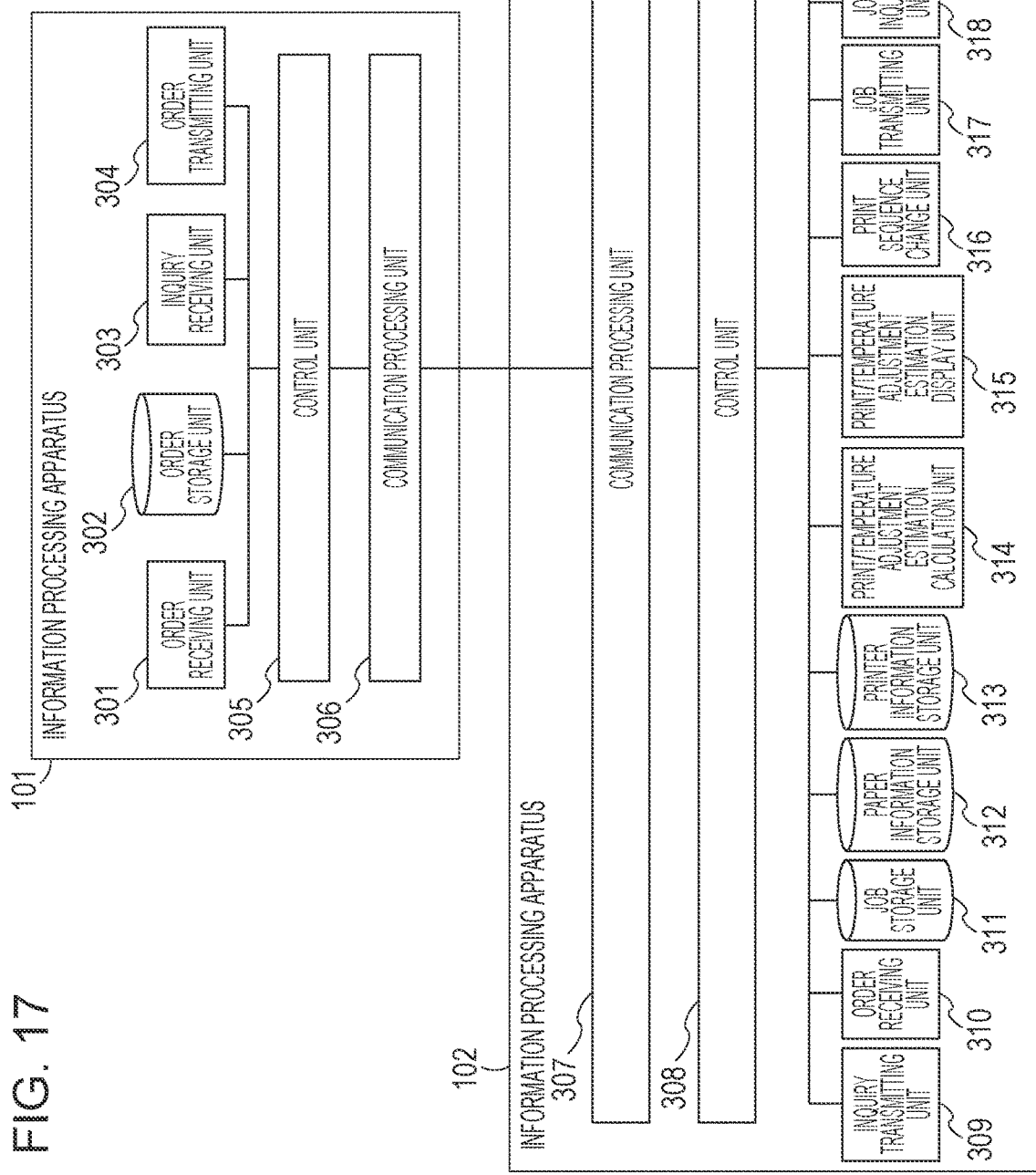
FIG. 17 illustrates functional configurations of the information processing apparatuses according to a third embodiment.

FIG. 17 illustrates functional configurations of the information processing apparatuses 101 and 102 in this embodiment. Although FIG. 17 illustrates configurations of functional units implemented by a computer executing a program, the configurations of the functional units need not be as in FIG. 17. For example, a plurality of functional units may be integrated, or some of the functions of a specific functional unit may be implemented by another functional unit. Each functional unit is implemented by the CPU 201 executing, as appropriate, a program stored in the storage device 206.

A fixing unit temperature obtaining unit 1701 is a unit for obtaining the current temperature of a fixing unit in the image forming apparatus 103. A fixing unit temperature calculation unit 1702 is a unit for calculating the current temperature a fixing unit in the image forming apparatus 103. The fixing unit temperature calculation unit 1702 is used to estimate the current temperature of the fixing unit in a case where the fixing unit temperature obtaining unit 1701 is unable to obtain the temperature of the fixing unit. A target printer determination unit 1703 is a unit for determining the target printer of a job saved in the job storage unit 311.

FIG. 18A illustrates examples of information for each printer model stored on the information processing apparatus 102, related to a temperature of a fixing unit (fixing temperature) necessary for printing on paper. In a column 1801, the number of mounted fixing units for each printer model is stored. A plurality of fixing units may be mounted depending on the printer, and therefore, the number of fixing units mounted in each printer is indicated in the column 1801. In a column 1802, information indicating whether each printer model has a function of allowing the temperature of its fixing unit to be externally obtained is stored. In a case where a printer model allows the temperature of its fixing unit to be externally obtained, "true" is stored. In a case where a printer model does not allow the temperature of its fixing unit to be externally obtained, "false" is stored.

FIG. 18B illustrates examples of information for each printer model stored on the information processing apparatus 102, regarding the time from when printing is completed to when the temperature of the fixing unit starts falling. In a column 1811, the model name (printer model) of each image forming apparatus (printer) 103 connected to the information processing apparatus 102 is stored. In a column 1812, for each printer model, the time from when printing of a job is completed to when the temperature of the fixing unit starts falling is stored. The time is indicated in seconds.

FIG. 18C illustrates examples of information stored on the information processing apparatus 102 and indicating the temperature range of a fixing unit mounted in each printer model. In a column 1821, the model name (printer model) of each image forming apparatus (printer) 103 connected to the information processing apparatus 102 is stored. In a column 1822, the name of a fixing unit mounted in each printer model is stored. In a column 1823, the temperature range of each fixing unit is stored. For example, in a case of printing on paper that requires fixing at a temperature within a range of 140° C. to 160°, a fixing unit that corresponds to "140° C. to 160° C." in this column is used.

Overall Flow of Print Process

Figure 19:
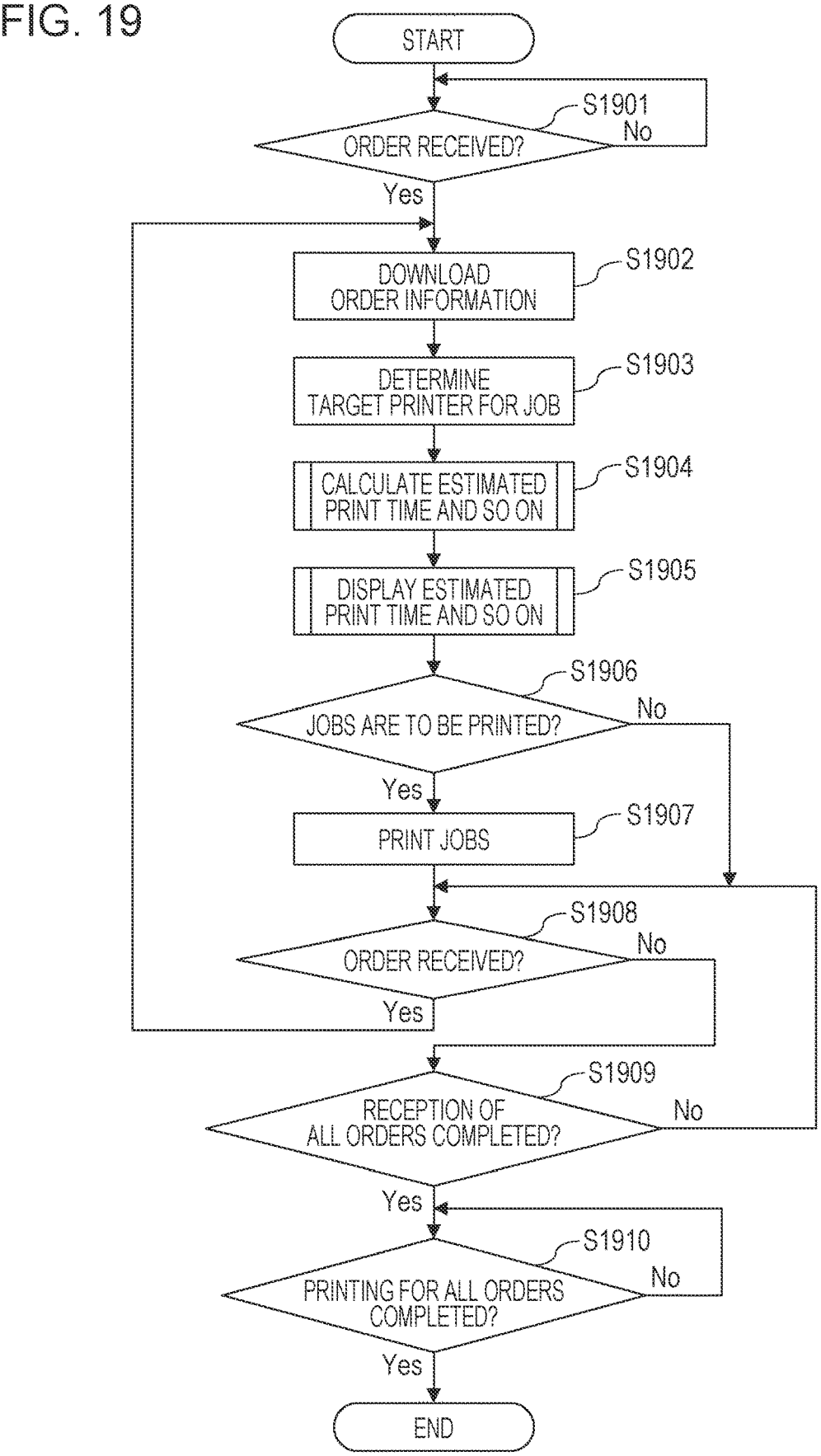
FIG. 19 is a flowchart illustrating an overall print process according to the third embodiment.

FIG. 19 is a flowchart illustrating an example overall flow of a print process from when an order is accepted to when printing is completed in the printing system 100 in the third embodiment. In S1901, the information processing apparatus 102 determines whether the information processing apparatus 101 has received a new order. When the order receiving unit 301 has accepted an order, the information processing apparatus 101 saves order information in the order storage unit 302. The inquiry transmitting unit 309 of the information processing apparatus 102 determines, via the communication processing unit 307, whether a new order has been accepted by the information processing apparatus 101. In a case where the information processing apparatus 102 determines that the information processing apparatus 101 has received a new order, the flow proceeds to S1902. In a case where reception is not confirmed, the information processing apparatus 102 waits for a new order to be accepted.

In S1902, the information processing apparatus 102 downloads the order information from the information processing apparatus 101. The inquiry transmitting unit 309 of the information processing apparatus 102 transmits, to the inquiry receiving unit 303 of the information processing apparatus 101, a request for downloading the order information. When the inquiry receiving unit 303 receives the request, the order transmitting unit 304 transmits the order information saved in the order storage unit 302 to the information processing apparatus 102. When the order receiving unit 310 receives the order information, the information processing apparatus 102 saves the order information in the job storage unit 311.

In S1903, the target printer determination unit 1703 of the information processing apparatus 102 determines the target printer 414 for a job saved in the job storage unit 311. The target printer 414 may be determined in accordance with a user operation accepted via a graphical user interface (GUI) or may be automatically determined in accordance with the attributes of the job. This unit for determining the target printer is outside the scope of the present disclosure, and therefore, a description thereof will be omitted.

In S1904, the print/temperature adjustment estimation calculation unit 314 of the information processing apparatus 102 calculates the estimated print time, the estimated temperature adjustment time, and the number of times of temperature adjustments for each image forming apparatus 103 (printer) on the basis of the job information saved in the job storage unit 311. The calculation process for the estimated print time and so on in S1904 is the same as that in FIG. 8.

In S1905, the print/temperature adjustment estimation display unit 315 of the information processing apparatus 102 displays on the UI, the estimated print time, the estimated temperature adjustment time, and the number of times of temperature adjustments calculated in S1904 and so on. The display process for the estimated print time and so on in S1905 is the same as that in FIG. 10. A screen displayed here is the same as that in FIG. 13.

In S1906, the information processing apparatus 102 determines whether the user has given a print instruction for jobs. A screen displayed for the user to give a print instruction in S1906 is the same as that in FIG. 12. The user gives a print instruction for jobs while viewing this screen (the job management screen 1201 in FIG. 12). In a case where a print instruction has been given, the flow proceeds to S1907. In a case where a print instruction has not been given, the flow proceeds to S1908.

In S1907, the job transmitting unit 317 of the information processing apparatus 102 transmits the jobs to the image forming apparatus 103. The image forming apparatus 103 performs printing of the jobs.

In S1908, the information processing apparatus 102 determines again whether the information processing apparatus 101 has received an order. The details of the process in S1908 are the same as those in S1901. In a case where the information processing apparatus 102 determines that the information processing apparatus 101 has received a new order, the flow returns to S1902. In a case where reception is not confirmed, the flow proceeds to S1909.

In S1909, the information processing apparatus 102 determines whether all orders have been received. In a case where all orders have been received, the flow proceeds to S1910. In a case where all orders have not been received, the flow returns to S1908.

In S1910, the information processing apparatus 102 determines whether printing for all orders is completed. Specifically, the information processing apparatus 102 determines whether all print statuses 415 saved in the job storage unit 311 are indicated as "Completed". In a case where all print statuses are indicated as "Completed", the flow in FIG. 19 ends. In a case where there is a print status for which "Completed" is not indicated, the information processing apparatus 102 waits for a specific time, and thereafter, checks the print status again.

Calculation Process for Estimated Temperature Adjustment Time

Figure 20:
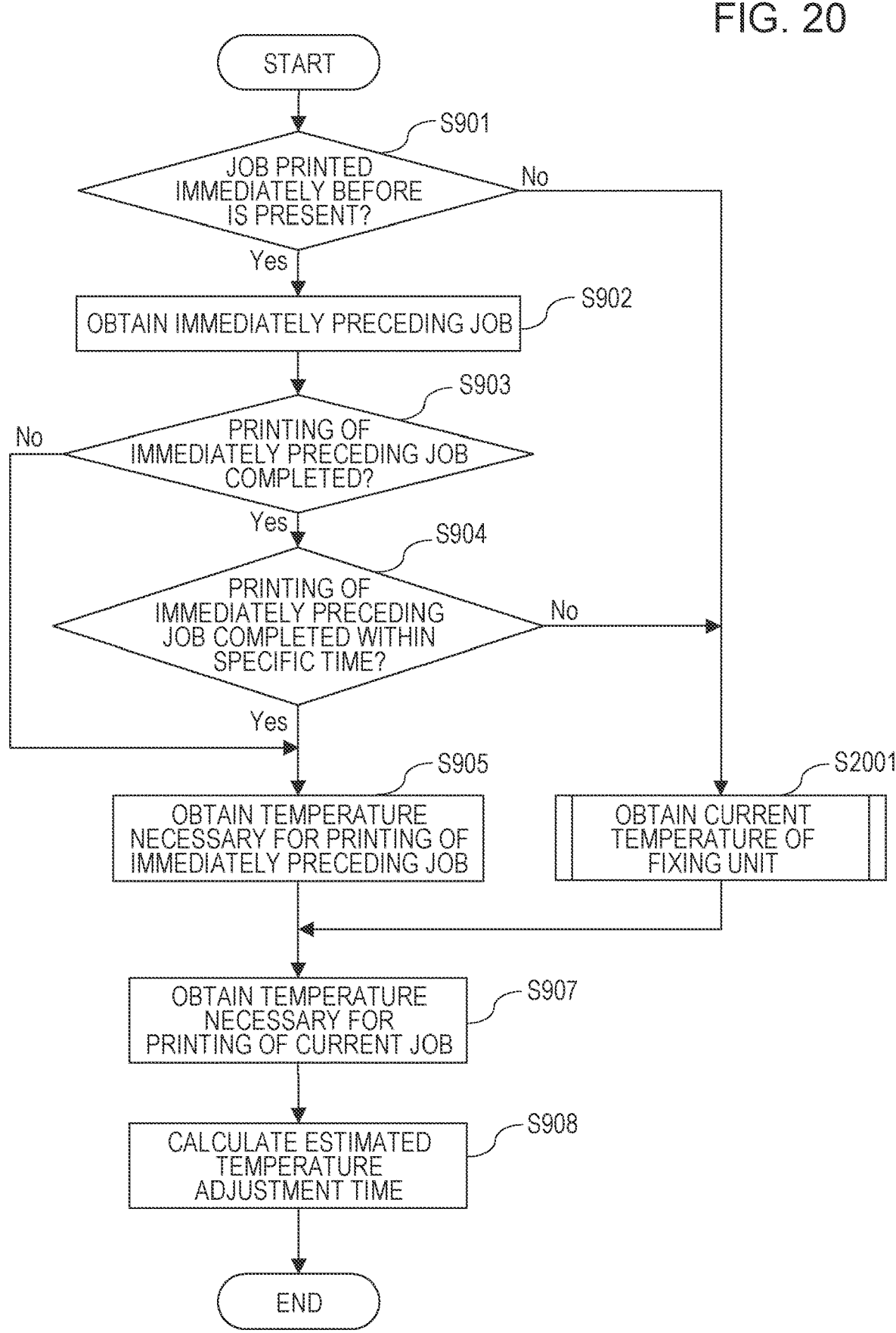
FIG. 20 is a flowchart illustrating a calculation process for an estimated temperature adjustment time according to the third embodiment.

FIG. 20 is a flowchart illustrating the details of the calculation process for the estimated temperature adjustment time performed in S810 in the third embodiment. This process is performed by the CPU 201 of the information processing apparatus 102 functioning as the print/temperature adjustment estimation calculation unit 314. In the calculation process for the estimated temperature adjustment time, for the printer selected in S802 or S817, the time taken for a temperature adjustment to be made immediately before printing of the job selected in S805, S807, or S815 is calculated.

In S2001, the CPU 201 obtains the current temperature of a fixing unit of the printer to which the job is transmitted. The method for obtainment will be described with reference to FIG. 21.

Calculation Method for Temperature of Fixing Unit of Printer

Figure 21:
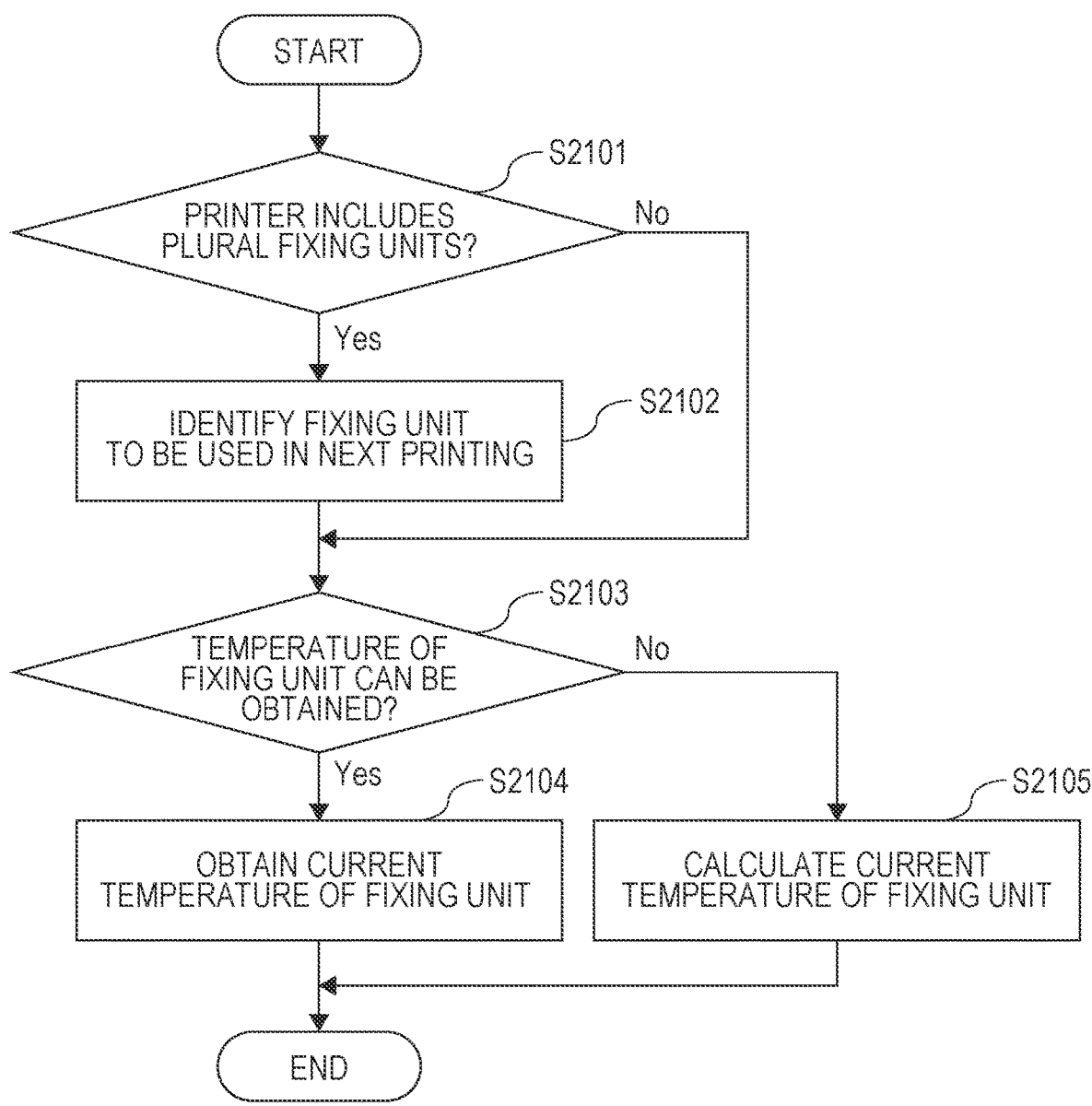
FIG. 21 is a flowchart illustrating a process for obtaining the current temperature of a fixing unit according to the third embodiment.

FIG. 21 is a flowchart illustrating the details of the process for obtaining the current temperature of a fixing unit of the printer. This process is performed by the CPU 201 of the information processing apparatus 102 functioning as the fixing unit temperature obtaining unit 1701. In a case where it is not possible to obtain the temperature of the fixing unit, this process is performed by the CPU 201 of the information processing apparatus 102 functioning as the fixing unit temperature calculation unit 1702.

In S2101, the fixing unit temperature obtaining unit 1701 determines whether the printer includes a plurality of fixing units. This is determined on the basis of the value in the column 1801 saved in the printer information storage unit 313. In a case where it is determined that the printer includes a plurality of fixing units, the flow proceeds to S2102. In a case where it is determined that the printer includes only one fixing unit, the flow proceeds to S2103.

In S2102, the fixing unit temperature obtaining unit 1701 identifies a fixing unit to be used in printing on the basis of a temperature necessary for printing of the job to be printed next. The fixing unit temperature obtaining unit 1701 identifies a necessary fixing temperature from information in the column 419 regarding paper to be used in printing of the job and from the fixing temperature 624 for each type of paper for the printer to be used in printing, and a fixing unit having a temperature range, in the column 1823, that corresponds to the identified temperature is used.

In S2103, the fixing unit temperature obtaining unit 1701 determines whether the current temperature of the fixing unit of the printer can be obtained. This is determined on the basis of the value in the column 1802 saved in the printer information storage unit 313. In a case where it is determined that the temperature can be obtained, the flow proceeds to S2104. Otherwise, the flow proceeds to S2105.

In S2104, the fixing unit temperature obtaining unit 1701 obtains the current temperature of the fixing unit of the printer.

In S2105, the fixing unit temperature calculation unit 1702 calculates the current temperature of the fixing unit of the printer. In a case where the printer includes one fixing unit, the fixing unit temperature calculation unit 1702 identifies, among jobs saved in the job storage unit 311, the job printed last by the printer for which the temperature of the fixing unit is to be obtained. The last printed job is a job, among jobs for which the target printer 414 is the same as the printer, for which the print completion date and time 416 is the latest. In a case where the printer includes a plurality of fixing units, the fixing unit temperature calculation unit 1702 identifies, among jobs saved in the job storage unit 311, the job printed last by the fixing unit, identified in S2102, of the printer for which the temperature of the fixing unit is to be obtained. Specifically, jobs for which the target printer 414 is the same as the printer are classified according to the temperature necessary for printing. The temperature necessary for printing can be determined with reference to FIG. 5 and FIG. 6C, and fixing units to be used in printing can be determined on the basis of the column 1823 in FIG. 18C. Among jobs printed by each fixing unit, a job for which the print completion date and time 416 is the latest is the last printed job.

After the job printed last by each fixing unit has been identified, the fixing unit temperature calculation unit 1702 compares the difference between the print completion date and time of the job printed last by the fixing unit and the current time with the time 1812, which is the time until the temperature of the fixing unit starts falling. In a case where the difference is smaller than the time 1812, the temperature of the fixing unit does not fall, and therefore, the fixing unit temperature calculation unit 1702 sets the temperature of the fixing unit necessary for printing of the job last printed by the fixing unit as the current temperature of the fixing unit. In a case where the difference is larger than the time 1812, the fixing unit temperature calculation unit 1702 determines that the temperature of the fixing unit starts falling, and subtracts the time 1812, after the elapse of which the temperature of the fixing unit starts falling, from the difference between the time of last printing and the current time to calculate the time elapsed since the start of temperature fall of the fixing unit. The fixing unit temperature calculation unit 1702 subtracts a value obtained by dividing the time elapsed since the start of temperature fall of the fixing unit by the rate 613 at which the temperature of the fixing unit is decreased, from the temperature necessary for printing of the job printed last by the fixing unit to calculate the current temperature of the fixing unit.

The present disclosure may be applied to a system constituted by a plurality of devices or may be applied to an apparatus constituted by a single device.

According to the above-described embodiments, information regarding a temperature adjustment necessary for printing of a job is provided, and therefore, it is possible to easily determine whether efficient printing is performed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present disclosure has been described with reference to example embodiments, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2020-184205 filed Nov. 4, 2020, which is hereby incorporated by reference herein in its entirety.

What is claimed is:

1. An information processing apparatus comprising:
   at least one processor; and
   a memory that stores a program which, when executed by the at least one processor, causes the at least one processor to function as:
   a first calculation unit configured to calculate information regarding a first temperature adjustment to be made for a fixing unit included in a first printing apparatus, the first temperature adjustment being made for printing a plurality of print jobs in a first print sequence;

a second calculation unit configured to calculate information regarding a second temperature adjustment to be made for a fixing unit included in a second printing apparatus different from the first printing apparatus, the second temperature adjustment being made for printing the plurality of print jobs in a first print sequence; and a display control unit configured to display a screen including a prediction time of the first temperature adjustment or a number of times of the first temperature adjustment in a case where the plurality of print jobs is printed by the first printing apparatus, and a prediction time of the second temperature adjustment or a number of times of the second temperature adjustment in a case where the plurality of print jobs is printed by the second printing apparatus based on the information regarding the first temperature adjustment and the information regarding the second temperature adjustment.

2. The information processing apparatus according to claim 1, further comprising a change unit configured to be capable of changing the first print sequence of the plurality of print jobs, wherein the change unit is configured to change the first print sequence to a second print sequence so as to decrease the number of times of temperature adjustments to be made for printing the plurality of print jobs.

3. The information processing apparatus according to claim 1, wherein the first calculation unit is configured to calculate the information regarding the first temperature adjustment on the basis of information regarding paper to be used in printing of the plurality of print jobs and information regarding the first printing apparatus.

4. The information processing apparatus according to claim 3, wherein the information regarding the paper includes a surface property and a basis weight of the paper.

5. The information processing apparatus according to claim 3, wherein the information regarding the first printing apparatus includes a print speed of the first printing apparatus and a time taken to change a temperature of the fixing unit.

6. The information processing apparatus according to claim 1, wherein the memory further causes the at least one processor to function as a transmission unit configured to transmit the plurality of print jobs.

7. An information processing method comprising:

calculating, by a first calculating, information regarding a first temperature adjustment to be made for a fixing unit included in a first printing apparatus, the first temperature adjustment being made for printing a plurality of print jobs in a first print sequence;

calculating, by a second calculating, information regarding a second temperature adjustment to be made for a fixing unit included in a second printing apparatus different from the first printing apparatus, the temperature adjustment being made for printing the plurality of print jobs in a first print sequence; and displaying a screen including a prediction time of the first temperature adjustment or a number of times of the first temperature adjustment in a case where the plurality of print jobs is printed by the first printing apparatus, and a prediction time of the second temperature adjustment or a number of times of the second temperature adjustment in a case where the plurality of print jobs is printed by the second printing apparatus based on the information regarding the first temperature adjustment and the information regarding the second temperature adjustment.

8. The information processing method according to claim 7, further comprising transmitting the plurality of print jobs.

* * * * *